US008255714B2

(12) United States Patent  
Singh et al.

(10) Patent No.: US 8,255,714 B2
(45) Date of Patent: Aug. 28, 2012

(54) SYSTEM AND METHOD FOR ESTABLISHING A DIRECT LINK ON THE HIGH THROUGHPUT CHANNEL OF A MULTI-RATE CHANNEL WIRELESS COMMUNICATIONS NETWORK

(75) Inventors: Harkirat Singh, Santa Clara, CA (US); Xiangping Qin, Carbondale, IL (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 603 days.

(21) Appl. No.: 12/482,328

(22) Filed: Jun. 10, 2009

(65) Prior Publication Data

US 2010/0014458 A1 Jan. 21, 2010

Related U.S. Application Data

(60) Provisional application No. 61/081,644, filed on Jul. 17, 2008.

(51) Int. Cl.
*G06F 1/26* (2006.01)
(52) U.S. Cl. ........................................ 713/320; 370/328
(58) Field of Classification Search .......... 713/300–340; 710/305–306; 370/431, 328, 338
See application file for complete search history.

(56) References Cited

U.S. PATENT DOCUMENTS 6,640,087 B2 10/2003 Reed et al.
(Continued)

FOREIGN PATENT DOCUMENTS

KR 1020090089373 A 8/2009

OTHER PUBLICATIONS

Notification of Transmittal of the International Search Authority, International Search Report and Written Opinion dated May 19, 2011 for International Application No. PCT/KR2010/006497 from Korean Intellectual Property Office, pp. 1-9, Seo-gu, Daejeon, Republic of Korea.

(Continued)

*Primary Examiner* — Brian Misiura
*Assistant Examiner* — Kim Huynh
(74) *Attorney, Agent, or Firm* — Kenneth L. Sherman, Esq.; Michael Zarrabian, Esq.; Sherman & Zarrabian LLP

(57) ABSTRACT

A system and method for wireless communication over multi-rate channels are disclosed. One embodiment of the system includes a first wireless device; a second wireless device; and an access point that can communicate over high-rate and low-rate channels. One or more of the first and second wireless devices and the access point can include neighbor information on the wireless stations in the wireless network. One or more of the first and second wireless devices and the access point may be configured to transmit a frame in an attempt to establish a direct link over the first channel between the first and second stations. Before transmitting the frame, the one or more of the first and second wireless devices and the access point may determine whether a direct link can be established over the first channel between the first and second stations, based at least partly on the neighbor information. This scheme can significantly reduce time wasted for unsuccessful direct link setup attempts for the high-rate channel transmissions.

36 Claims, 14 Drawing Sheets

U.S. PATENT DOCUMENTS

| | | | |
|---|---|---|---|
| 7,366,089 | B2 | 4/2008 | Tehrani et al. |
| 7,831,738 | B2 | 11/2010 | Rofougaran |
| 7,986,949 | B2 | 7/2011 | Ryu et al. |
| 8,077,683 | B2 * | 12/2011 | Rudolf et al. ............... 370/338 |
| 2005/0143133 | A1 | 6/2005 | Bridgelall |
| 2006/0268760 | A1 * | 11/2006 | Fang et al. ............... 370/328 |
| 2007/0002876 | A1 | 1/2007 | Berkman et al. |
| 2007/0099668 | A1 | 5/2007 | Sadri et al. |
| 2007/0195721 | A1 | 8/2007 | Backes et al. |
| 2007/0258508 | A1 | 11/2007 | Werb et al. |
| 2008/0096560 | A1 | 4/2008 | Felske et al. |
| 2009/0232049 | A1 | 9/2009 | Singh et al. |
| 2010/0034143 | A1 | 2/2010 | Cordeiro et al. |
| 2010/0265990 | A1 | 10/2010 | Birru |
| 2010/0315954 | A1 | 12/2010 | Singh et al. |
| 2011/0038290 | A1 | 2/2011 | Gong et al. |
| 2011/0069650 | A1 | 3/2011 | Singh et al. |
| 2011/0128901 | A1 | 6/2011 | Lee et al. |
| 2011/0205928 | A1 | 8/2011 | Pelletier et al. |

OTHER PUBLICATIONS

Cianca et al., Location/Situation-Aware Architecture for Mobility Management over Heterogeneous Networks, Proceedings of the 2nd International Conference on Mobile Multimedia Communications, 2006, 6 pages.

IEEE 802.11, Standard for Information Technology—Telecommunications and Information Exchange between Systems—Local and Metropolitan Area Networks—Specific requirements Part 11: Wireless LAN Medium Access Control (MAC) and Physical Layer (PHY) Specifications—2007 (Revision of IEEE Std 802.11-1999), IEEE Computer Society, 1232 pages, (Jun. 12, 2007).

Poroor et al., Fast Dual-Radio Cross-Layer Handoffs in Multi-Hop Infrastructure-mode 802.11 Wireless Networks for In-Vehicle Multimedia Infotainment, IEEE ANTS 2008, 3 pages.

Vaios et al., Increasing Capacity in Dual-Band WLANS Through AD-HOC Networking, University of Athens, Department of Informatics & Telecommunications, International Journal of Wireless and Mobile Computing (IJWMC), Special Issue on Wireless Ad Hoc Networking, 2005, 13 pages.

"A 5/60GHz hybrid system concept," *IST Broadway*, 12 pages; available at www.ist-browadway.org/documents/broadway-broadband_air_interfaces_cluster.pdf (last visited on Apr. 24, 2008).

"Evaluation of centralized adhoc network architecture (CANA)," BAI cluster workshop Mar. 2004, Marc de Courville and all, IST BroadWay project, Jun. 1, 2004, 17 pages.

Draves et al., "Routing in multi-radio, multi-hop wireless mesh networks," 15 pages, MobiCom '04, Sep. 26-Oct. 1, 2004.

IEEE P802.11™/ Standard for information technology—Telecommunications and information exchange between systems—Local and metropolitan area networks-Specific requirements—Part 11: Wireless LAN Medium Access Control (MAC) and Physical Layer (PHY) specifications: Amendment 8: Medium Access Control (MAC) Quality of Service Enhancements *IEEE*, 2005, 211 pages.

IEEE P802.11z™/ D1.0, Draft Standard for information technology—Telecommunications and information exchange between systems—Local and metropolitan area networks—Specific-requirementsPart 11: Wireless LAN Medium Access Control (MAC) and Physical Layer (PHY) specifications: Amendment 7: Direct Link Setup *IEEE*, 2007, 36 pages.

IEEE P802.11n™/ D3.00, Draft Standard for information technology—Telecommunications and information exchange between systems—Local and metropolitan area networks—Specific requirements—Part 11: Wireless LAN Medium Access Control (MAC) and Physical Layer (PHY) specifications: Amendments 4: Enhancements for Higher Throughput, *IEEE*, 2007, 544 pages.

IEEE 802.11 Standard for Information technology—Telecommunications and information exchange between systems—Local and metropolitan area networks—Specific requirements. Part 11: Wireless LAN Medium Access Control (MAC) and Physical Layer (PHY) specifications, IEEE Computer Society, pp. 87-140, 146-148, 456-461, (Jun. 12, 2007).

Heinzelman et al., "Energy efficient communication protocol for wireless microsensor networks," *Proc. The $33^{rd}$ Hawaii International Conference on System Science*, Hawaii, U.S.A., Jan. 2000.

Iannone et al., "Can multi-rate radios reduce end-to-end delay in mesh networks? A simulation case study," *Mesh Networking: Realizing the Wireless Internet (Meshnets)*, Jul. 2005.

Ramachandran et al., "Interference-aware channel assignment in multi-radio wireless mesh networks," *Infocom* 2006.

Ros et al., "Cluster-based OLSR extensions to reduce control overhead in mobile Ad hoc networks," *International wireless Communications and Mobile Computing Conference (IWCMC 2007)* Department of Information and Communications Engineering, University of Murcia, pp. 202-207, Aug. 12-16, 2007, Honolulu, Hawaii, U.S.A.

Villasenor-Gonzalez et al., "Holsr: A hierarchical proactive routing mechanism for mobile Ad hoc networks," *IEEE Communications Magazine* (Jul. 2005).

Madhow, U., "MultiGigabit Millimeter Wave Communication: System Concepts and Challenges," Proceedings of the 2008 Information Theory and Applications Workshop, Jan. 27, 2008-Feb. 1, 2008, pp. 193-196, IEEE, United States.

U.S. Non-Final Office Action for U.S. Appl. No. 12/721,364, mailed Jun. 12, 2012.

U.S. Non-Final Office Action for U.S. Appl. No. 12/271,340, mailed Jul. 10, 2012.

\* cited by examiner

1000A

| BSSID | SOURCE ADDRESS | DESTINATION ADDRESS | LINK QUALITY TYPE | HIGH RATE CHANNEL ID | 2-WAY NEIGHBOR STATUS ON HRC |
|---|---|---|---|---|---|
| 1010a | 1020a | 1030a | 1040a | 1050a | 1060a |

1000B

| BSSID | SOURCE ADDRESS | DESTINATION ADDRESS | 2-WAY NEIGHBOR STATUS ON HRC | LINK QUALITY OF HRC |
|---|---|---|---|---|
| 1010b | 1020b | 1030b | 1070b | 1080a |

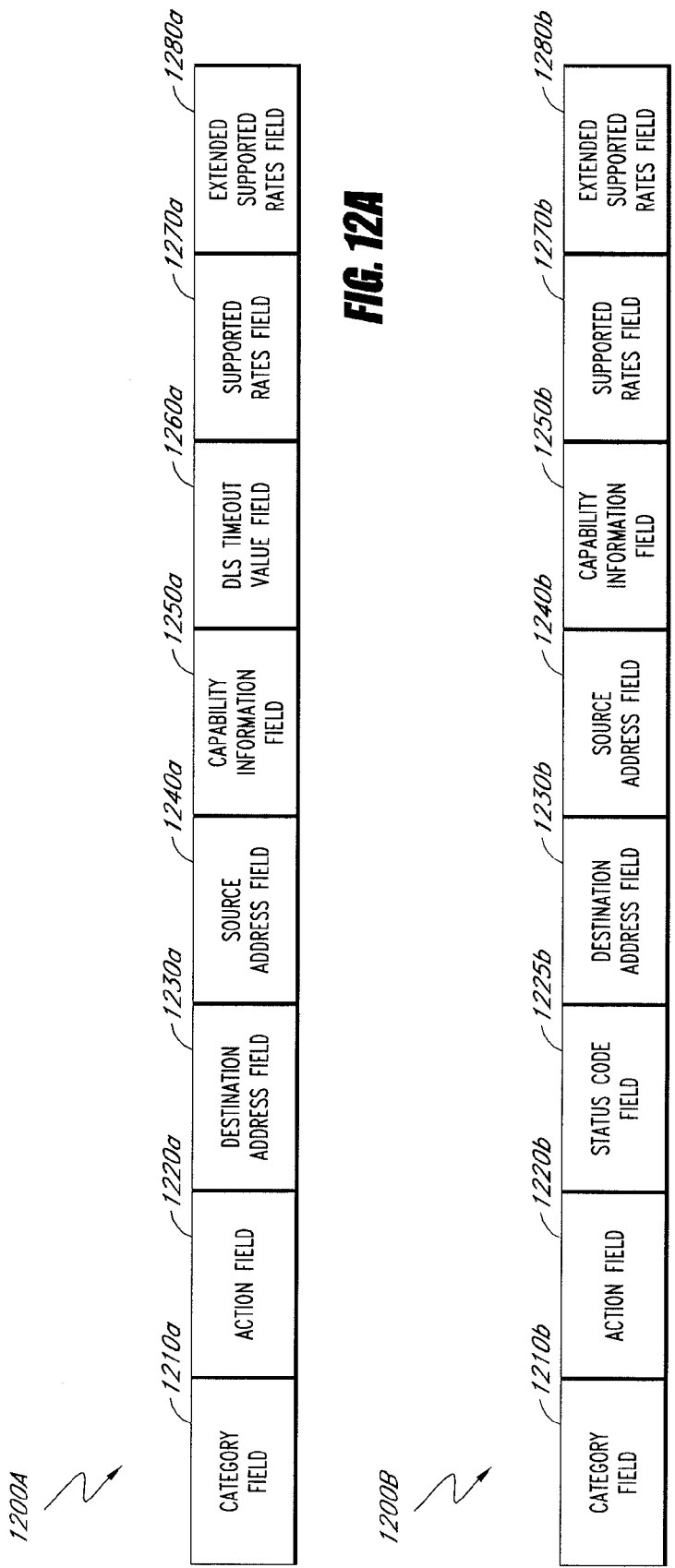

SYSTEM AND METHOD FOR ESTABLISHING A DIRECT LINK ON THE HIGH THROUGHPUT CHANNEL OF A MULTI-RATE CHANNEL WIRELESS COMMUNICATIONS NETWORK

RELATED APPLICATION

This application claims priority from U.S. Provisional Patent Application No. 61/081,644, filed on Jul. 17, 2008, which is incorporated herein by reference.

BACKGROUND OF THE INVENTION

1. Field of the Invention

The present invention relates to a wireless network, and in particular, to a wireless network having multi-rate channels.

2. Description of the Related Technology

Wireless networks typically include a plurality of wireless stations. When a wireless network includes three or more wireless stations, the wireless network needs to manage the transmission of data and/or control signals between the wireless stations.

Certain wireless networks include an access point and a plurality of non-access point (non-AP) stations. In many instances, such non-AP stations are generally required to transmit data and/or control signals between them via the access point, but are not generally allowed to transmit such signals directly therebetween.

However, in some instances, for example, in a network in compliance with IEEE 802.11, a direct communication between non-AP stations are allowed. In such instances, before a non-AP station attempts to transmit signals directly to another non-AP station, the non-AP station is required to set up a direct link with the other non-AP station for such transmissions, using a specific protocol. In IEEE 802.11, such a protocol is referred to as "direct link setup (DLS)."

Some wireless networks use multi-rate channels for the transmission of data and/or control signals between wireless stations therein. The multi-rate channels may include a relatively high-rate channel that has a short coverage and directionality. Such wireless networks may also allow a direct link for transmission between non-AP stations. Such wireless networks, however, may have a problem due to the characteristics of the high-rate channel. Therefore, there is a need for a scheme suitable for wireless networks employing such a high-rate channel.

SUMMARY OF CERTAIN INVENTIVE ASPECTS

In one embodiment, there is a method of data communication in a wireless network. The network includes a plurality of access point and non-access point stations that are capable of transmitting data and/or control signals over a first channel and a second channel. The first channel has a first frequency and directionality, and the second channel has a second frequency and omni-directionality. The second frequency is lower than the first frequency. The method includes: determining, by a source non-access point station including source neighbor information on non-access point stations neighboring the source station, whether a destination non-access point station is capable of being in a direct link with the source station over the first channel, based at least partly on the source neighbor information; and transmitting, by the source station, a request for establishing a direct link with the destination station to the access point.

In another embodiment, there is a method of wireless communication in a wireless network. The network includes a plurality of access point and non-access point stations that are capable of transmitting data and/or control signals over a first channel and a second channel. The first channel has a first frequency and directionality, and the second channel has a second frequency and omni-directionality. The second frequency is lower than the first frequency. The method includes: receiving, by the access point, a request from a source non-access point station for establishing a direct link with a destination non-access point station; and determining, by the access point including access point neighbor information on relationships between non-access point stations neighboring each other in the network, whether the source and destination stations are capable of being in a direct link with each other over the first channel, based at least partly on the access point neighbor information.

In yet another embodiment, there is a method of wireless communication in a wireless network. The network includes a plurality of access point and non-access point stations that are capable of transmitting data signals over a first channel and data and/or control signals over a second channel. The first channel has a first frequency and directionality, and the second channel has a second frequency and omni-directionality. The second frequency is lower than the first frequency. The method includes: receiving, by a destination non-access point station, a request for establishing a direct link with the destination station from a source non-access point station via the access point, wherein the destination station includes neighbor information on non-access point stations neighboring the destination station; and determining, by the destination station, whether the source and destination stations are capable of being in a direct link with each other over the first channel, based at least partly on the neighbor information.

In yet another embodiment, there is a device for wireless communication in a wireless network including an access point. The device includes: a first antenna system configured to provide directional transmission/reception over a first channel at a first frequency within a first range; and a second antenna system configured to provide omni-directional transmission/reception over a second channel at a second frequency within a second range. The second frequency is lower than the first frequency, and the second range is greater than the first range. The device also includes neighbor information on relationships between the device and other wireless devices in the wireless network; and a medium access control (MAC) layer configured to send the access point a request for establishing a direct link over the first channel with one of the other wireless devices. The MAC layer is further configured to determine whether to send the request, based at least partly on the neighbor information.

In yet another embodiment, there is an access point device for wireless communication in a wireless network including wireless stations. The device includes: a first antenna system configured to provide directional transmission/reception over a first channel at a first frequency within a first range; and a second antenna system configured to provide omni-directional transmission/reception over a second channel at a second frequency within a second range. The second frequency is lower than the first frequency, and the second range is greater than the first range. The device also includes information on relationships between wireless stations neighboring each other in the wireless network; and a medium access control (MAC) layer configured to receive, from a source station, a request for establishing a direct link over the first channel between the source station and a destination station.

The MAC layer is further configured to determine whether to forward the request to the destination station, based at least partly on the information.

In yet another embodiment, there is a wireless communication system. The system includes: a first wireless device; a second wireless device; and an access point. Each of the first and second wireless devices and the access point includes: a first antenna system configured to provide directional transmission/reception at a first frequency within a first range; and a second antenna system configured to provide omni-directional transmission/reception at a second frequency within a second range. The second frequency is lower than the first frequency, and the second range is greater than the first range. Each of the first and second wireless devices and the access point also includes information on relationships between wireless stations neighboring each other in the wireless network. One or more of the first and second wireless devices and the access point is configured to transmit a message in an attempt to establish a direct link over the first channel between the first and second stations. The one or more of the first and second wireless devices and the access point is further configured to determine whether a direct link can be established over the first channel between the first and second stations, based at least partly on the information, before transmitting the frame.

BRIEF DESCRIPTION OF THE DRAWINGS

FIG. 12A is a frame format of a direct link setup request according to one embodiment.

FIG. 12B is a frame format of a direct link setup response according to one embodiment.

DETAILED DESCRIPTION OF CERTAIN INVENTIVE EMBODIMENTS

Figure 1:
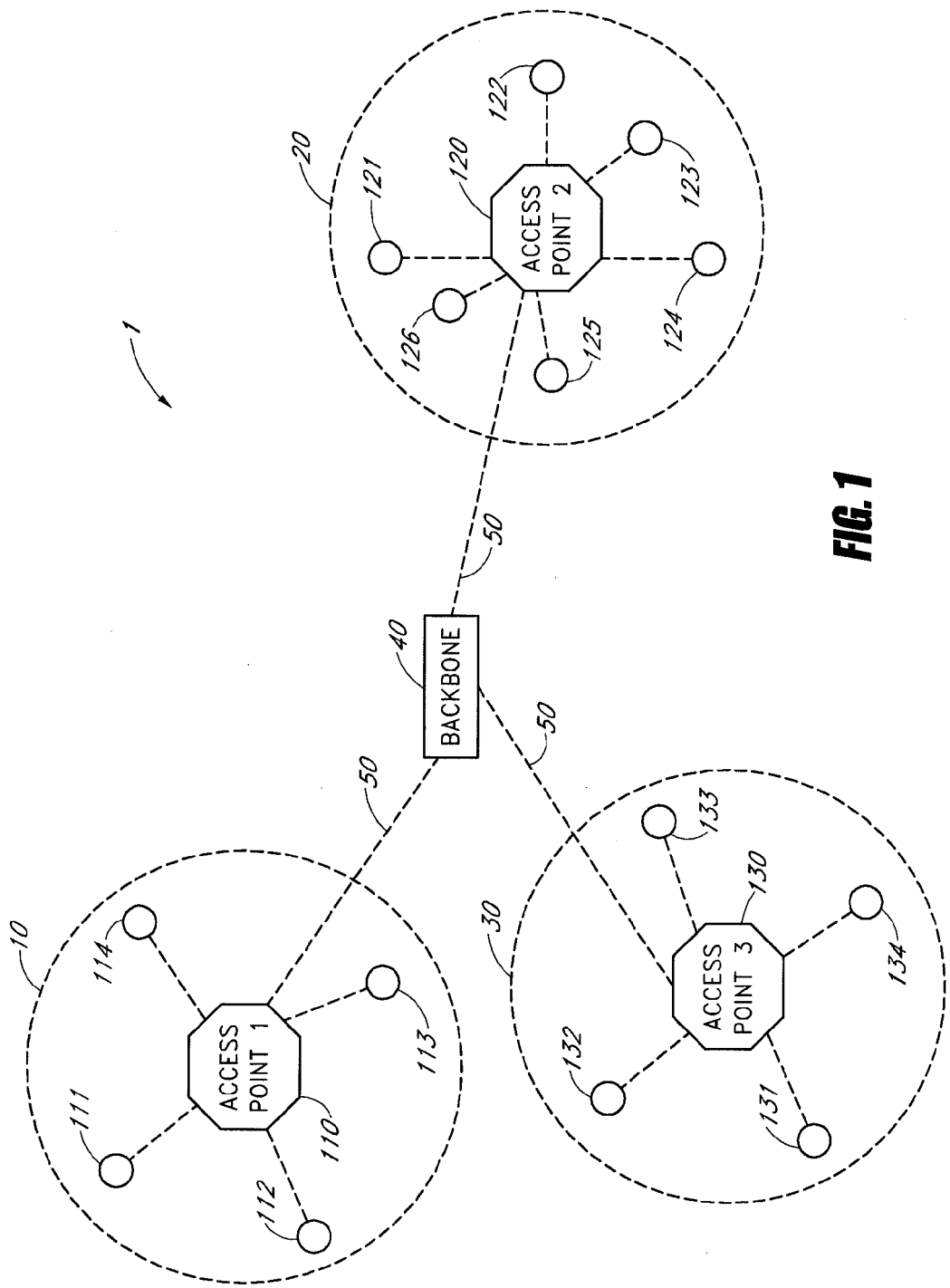
FIG. 1 is a block diagram illustrating an example wireless network including a plurality of sub-networks.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. Various processors, memories, computer readable media and programs can be used to implement the invention.

Overview of Wireless Network

Referring to FIG. 1, an example wireless network will be described below. The wireless network 1 includes a plurality of sub-networks 10, 20, 30 and a network backbone 40. The illustrated portion of the network 1 includes three sub-networks, but a skilled technologist will appreciate that the network can include more or less sub-networks.

Each of the sub-networks 10, 20, 30 includes an access point 110, 120, 130 and one or more wireless stations or devices 111-114, 121-126, 131-134. Each of the access points 110-130 is capable of performing wireless communication with the one or more wireless stations within the sub-network according to a wireless communication protocol. The access points 110-130 are also connected to the network backbone 40 via wired or wireless channels 50. Each of the access points 110-130 may provide communication between stations within its respective sub-network 10-30 or between a station in its sub-network and another station in another sub-network.

The one or more wireless stations are located within a coverage region within which the access point can communicate wirelessly. The one or more stations can be electronic devices that can wirelessly connect to one or more of the access points 110, 120, 130. Examples of such electronic devices include, but are not limited to, a mobile phone, a telephone, a television, a set-top box, a computer monitor, a computer, a hand-held computer, a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, a game device, etc. In certain arrangements, one or more stations can belong to two or more sub-networks. In certain embodiments, at least one of the access points 110, 120, 130 may be part of such an electronic device.

The network backbone 40 serves to interconnect the sub-networks 10, 20, 30 to one another, providing a path for the exchange of information between them. The network backbone 40 can be connected to another backbone for communication with another network.

In one embodiment, the sub-networks 110-130 may be in compliance with the same communication protocol. In other embodiments, one of the sub-networks 110-130 may comply with a communication protocol different from the protocols of the other sub-networks. In certain arrangements, the access points and the stations may be in compliance with the IEEE 802.11 standard. In one embodiment, the network 1 can form a wide area network (WAN), and each of the sub-networks 10-30 can form a local area network (LAN). In another embodiment, the network 1 can form a local area network (LAN). In certain embodiments, at least one of the sub-networks 110-130 may form an ad-hoc network without an access point.

Wireless Network Employing Multi-Rate Channels

In one embodiment, each station on a wireless network uses both a high-rate channel (HRC) and a low-rate channel (LRC). The high-rate channel has a shorter range than the low-rate channel. The high-rate channel may be directional whereas the low-rate channel may be directional or omni-directional. In certain embodiments, the low rate channel may be omni-directional as a default, and optionally directional.

The channels can be established to be directional or omni-directional by using different antenna systems. In the context of this document, the terms "directional channel" and "omni-directional channel" can be interchangeably used with "directional transmission/reception capability" and "omni-directional transmission/reception capability," respectively.

In some embodiments, a coordinator device (e.g., an access point) on the network may schedule high-rate transmissions between respective two of the stations such that the transmissions do not overlap with one another. In other embodiments, a station on the network may transmit data over either the high-rate channel or the low-rate channel, depending on the channel conditions. For example, when the directional high-rate channels that are primarily used for data transmission are blocked or face frequent outages or poor channel quality, the low-rate channel can be alternatively used for data transmission. In certain embodiments, the high-rate channel may also be used for transmitting control messages.

Figure 2:
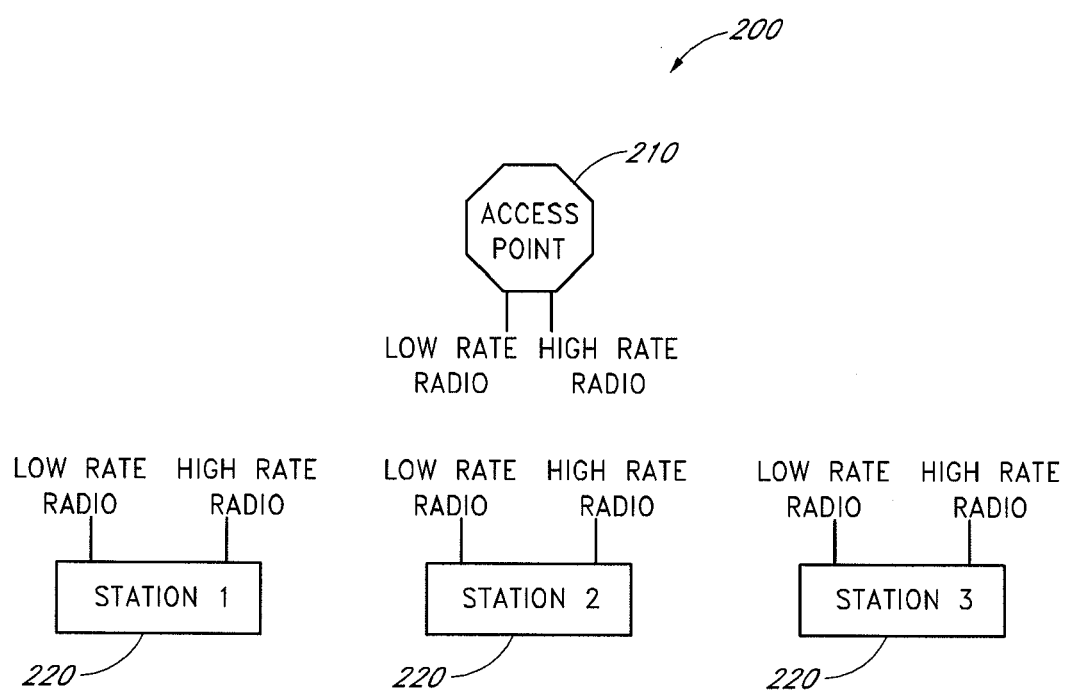
FIG. 2 is a block diagram of a wireless network including an access point and wireless stations employing a high-rate radio and a low-rate radio according to one embodiment.

Referring to FIG. 2, a system for a wireless network employing multi-rate channels according to one embodiment will be now described below. The illustrated system 200 includes an access point 210 and first to third stations 220, 230, 240. The access point 210 and the stations 220-240 can communicate with one another via a low-rate channel (LRC) and a high-rate channel (HRC). Each of the access point 210 and the stations 220-240 includes two interfaces or radios for the low-rate channel and high-rate channel, respectively.

In one embodiment, the high-rate channel may have a frequency from about 6 GHz to about 300 GHz. Such a frequency may include an extremely high frequency (EHF). The high-rate channel may be a 60 GHz channel that is supported by 60 GHz millimeter-wave radio. In one embodiment, the communication range of a 60 GHz channel for an indoor environment may be of the order of 10 meters. In other embodiments, the high-rate channel can use a terahertz frequency ranging between 300 GHz and 3 THz.

Figure 3A:
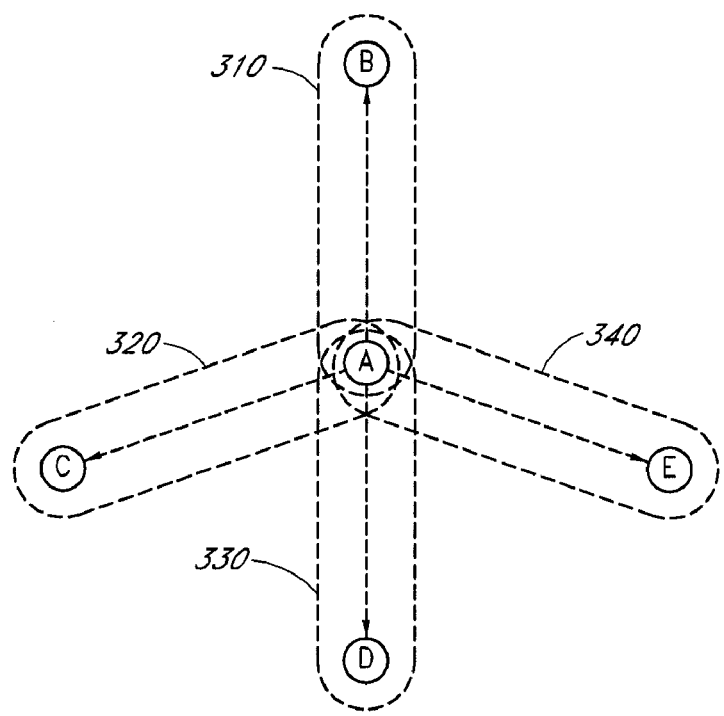
FIG. 3A is a diagram illustrating high-rate directional channels used in the network of FIG. 2.

The high-rate channel may be directional, as shown in FIG. 3A. In FIG. 3A, a station A can establish a high-rate channel 310-340 for communication with one of neighboring stations B-E. The station A can send data and/or a control signal to only one of the stations B-E over a high-rate channel 310-340 at a time.

The low-rate channel may be a channel having a frequency below 6 GHz. In one embodiment, the low-rate channel can be a 2.4 GHz or 5 GHz channel that can support Wireless Local Area Network (WLAN). The interface for the low-rate channel may be in compliance with IEEE 802.11. All versions of the IEEE 802.11 standard are incorporated herein by reference. In one embodiment, the low-rate channel for an indoor environment that has a frequency lower than 6 GHz can have a range of about 20 meters to about 100 meters.

Figure 3B:
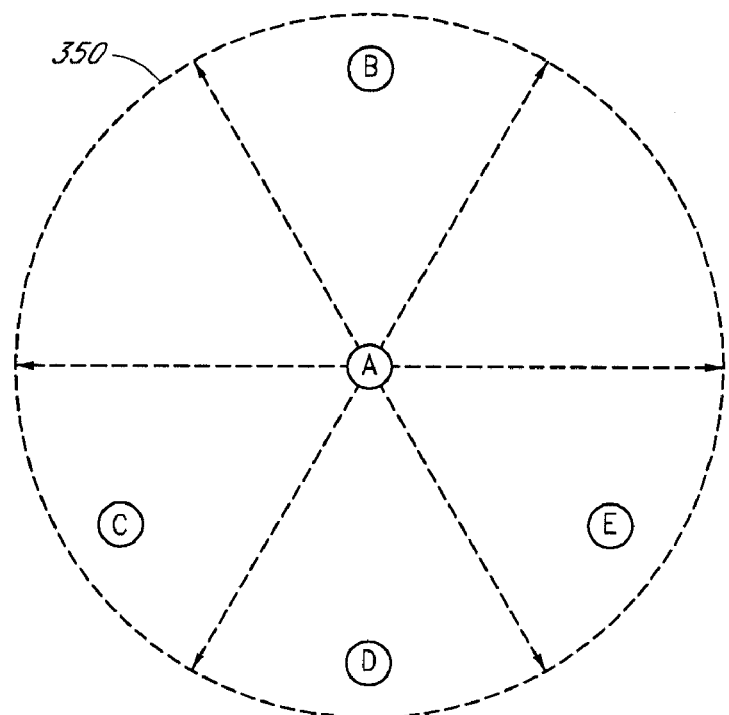
FIG. 3B is a diagram illustrating a low-rate omni-directional channel used in the network of FIG. 2.

The low-rate channel may be omni-directional, as shown in FIG. 3B. In FIG. 3B, the station A can establish a low-rate channel 350 for communication with the neighboring stations B-E. The station A can send a signal simultaneously to the neighboring stations B-E via the low-rate channel 350. In addition, the signal can be sent to other stations as long as the other stations are within the range of the low-rate channel. In another embodiment, the low-rate channel may be directional. In certain embodiments, the low-rate channel can be either directional or omni-directional, depending on the transmission needs. In some embodiments, the low-rate channel can be omni-directional as a default, and optionally directional.

In one embodiment, the high-rate channel may be used to transmit data, information, or certain control messages. The data can be audio, video, and/or textual data in any suitable form. The data can be compressed or uncompressed. The data may be in an encrypted or unencrypted form. In certain embodiments, the data may include management messages or information for the wireless network.

The low-rate channel may be used to transmit control signals. The control signals may be those used for reservation and allocation of radio sources used in the high-rate channel. For example, at least some of the control signals can be used for reservation of contention free period for data transmission, beacon transmission, and other control messages. In some embodiments, the low-rate channel may be used to exchange control messages related to, for example, beamforming on the high-rate channel, channel quality, or the like. In transmitting such control signals, the wireless stations may use the most robust modulation and coding scheme available in the network so as to minimize transmission errors.

In certain embodiments, the low-rate channel may also be used for transmitting data. For example, when the high-rate channel is in a good condition, a source station can send a destination station data (for example, uncompressed data) over the high-rate channel. However, the high-rate channel which is directional can be easily blocked. In another instance where either or both of the source and destination stations are moving, the stations may lose wireless connectivity established over the high-rate channel. In these circumstances, the source station may reduce the size of the data by, for example, at least partially compressing the data, and transmit the data over the low-rate channel to the destination station.

Figure 4:
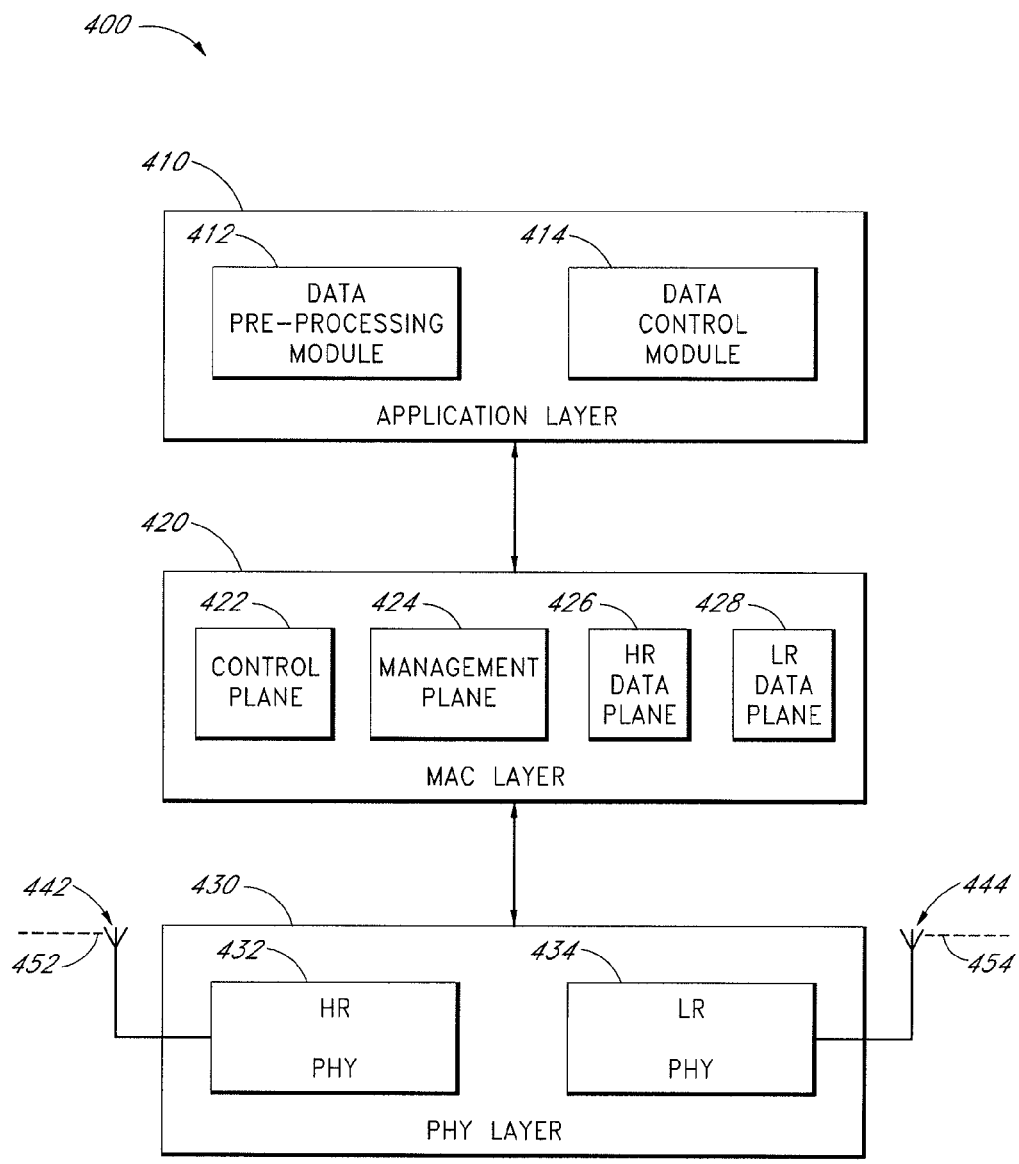
FIG. 4 is a block diagram of a wireless station including a high-rate radio and a low-rate radio according to one embodiment.

Referring to FIG. 4, a wireless station that can communicate with other stations or an access point in a network via a high-rate channel and a low-rate channel according to one embodiment will be described below. The illustrated wireless station 400 may serve as a transmitter, and includes an application layer 410, a medium access control (MAC) layer 420, and a physical (PHY) layer 430, and a first antenna system 442, and a second antenna system 444.

The application layer 410 may include a data pre-processing module 412 and a data control module 414. The data pre-processing module 412 can perform pre-processing of data, such as partitioning of data. The data control module 414 provides a standard way to exchange data handling information such as capability information. For example, before a connection begins, the data control module 414 negotiates the data formats to be used, and when the need for the connection is completed, data control commands are used to stop the connection.

The MAC layer 420 may include a control plane 422, a management plane 424, a high-rate data plane 426, and a low-rate data plane 428. The control plane 422 serves to control how the station 400 gains access to data and permission to transmit it over the network. In one embodiment, at least one of the control plane 422 and the management plane 424 is used to allocate contention-free periods on the high-rate channel. The control plane 422 and the management plane 424 may use the low rate channel for transmission of packets. In some embodiments, the control plane 422 and the management plane 424 may be in compliance with the IEEE 802.11 standard.

The high-rate data plane 426 serves to process data from the application layer 410 to form packets suitable for high-rate transmission over a high-rate channel 452. The low-rate data plane 428 serves to process data from the application layer 410 to form packets suitable for low-rate transmission over a low-rate channel 454. In one embodiment, both the high rate data plane 426 and the low rate data plane 428 may use the control plane 422 and the management plane 424 when transmitting data. In other embodiments, each of the high rate data plane 426 and the low rate data plane 428 can include dedicated control and management planes.

The PHY layer 430 serves to further process the data and/or control packets from the MAC layer 420, and send them over wireless channels. The illustrated PHY layer 430 includes a high-rate (HR) PHY module 432 and a low-rate (LR) PHY module 434. The high-rate PHY module 432 adds PHY headers to data packets, and sends the packets over the high-rate channel 452 via the first antenna system 442. The first antenna system 442 may be capable of directional transmission and/or reception. The low-rate PHY module 432 adds PHY headers to control or data packets from the MAC layer 420, and sends the packets over the low-rate channel 454 via the second antenna system 444. The second antenna system may be capable of omni-directional and/or directional transmission and/or reception. In certain embodiments, the second antenna system 444 is configured to perform omni-directional transmission/reception as a default and to optionally provide directional transmission/reception.

Alternatively, the illustrated wireless station 400 may serve as a receiver. When serving as a receiver, the application layer 410, the MAC layer 420, and the PHY layer 430 of the station 400 can perform an inverse processing method of the layers 410-430 to regenerate data from data packets transmitted from another station over the wireless channels. A skilled technologist will appreciate that the configuration of the station can vary widely, depending on the design of the station as long as the station can send data and control information via a high rate channel and a low-rate channel, as described above.

Although not illustrated, the access point AP may include an application layer, a MAC layer, and a PHY layer, the configurations of which can be as described above with respect to FIG. 4. The access point may also include a routing module for connecting to a backbone. The routing module can provide a wired or wireless connection to the backbone, depending on the design of the network to which the access point belongs.

Data Communication Via a Direct Link in a Multi-Rate Channel Wireless Network a. Conventional Direct Link Setup In certain wireless networks including at least one access point and a plurality of non-access point stations, a direct link between two of the non-access point stations are allowed for wireless transmission. For example, a conventional wireless system in compliance with the IEEE 802.11 standard allows a bi-directional link between two non-access point (non-AP) stations. Under IEEE 802.11, one non-AP quality of service (QoS) station may directly communicate with another non-AP QoS station operating in the same infrastructure QoS basic service set (BSS) without passing through a QoS access point (AP). Such a bi-directional link can be generally referred to as a "direct link." Once a direct link has been set up between two non-AP stations, all frames between the two stations can be exchanged directly.

Figure 5:
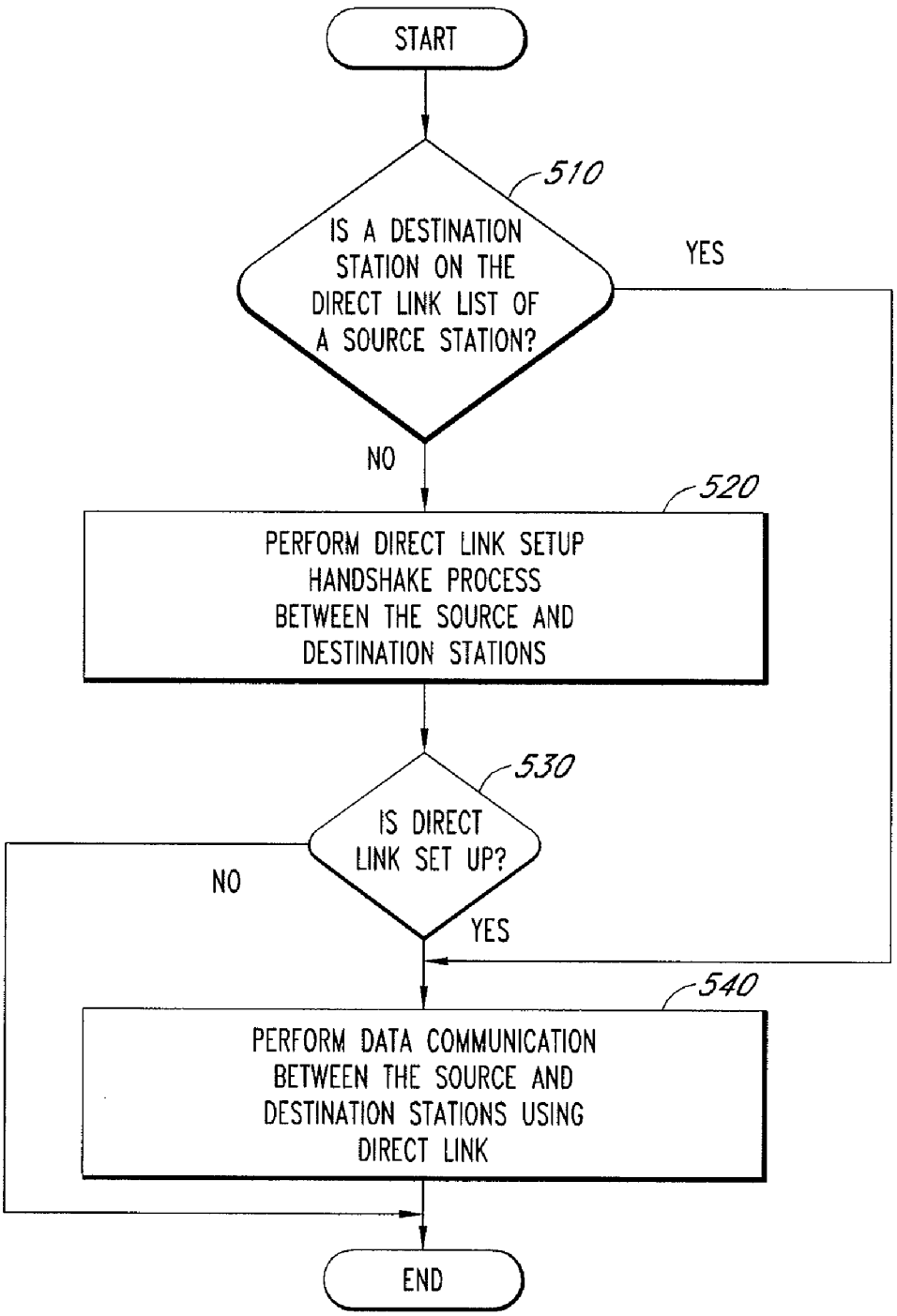
FIG. 5 is a flowchart illustrating a conventional method of transmitting data via a direct link between stations in a wireless network.

Referring to FIG. 5, a conventional method of communicating data via a direct link between two non-access point stations in a conventional wireless network according to IEEE 802.11 will be described below. The wireless network may include an access point (AP) and a plurality of non-AP stations. In the context of this document, a non-AP station initiating a direct link setup is referred to as a "source station," and another non-AP station that is targeted at by the source station for a direct link setup is referred to as a "destination station." Each station in the wireless network may carry a direct link list which includes a list of other non-AP stations that have been in a direct link with the station.

At block 510, a source station determines if a destination station is on the direct link list of the source station. If "yes" at block 510, the source station may perform data communication with the destination station using a direct link at block 540.

Figure 6A:
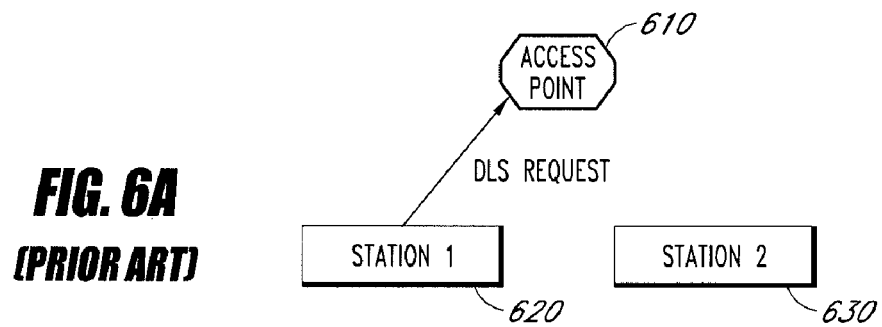
FIGS. 6A-6D are diagrams illustrating a conventional method of setting up a direct link between stations in a wireless network.
Figure 6B:
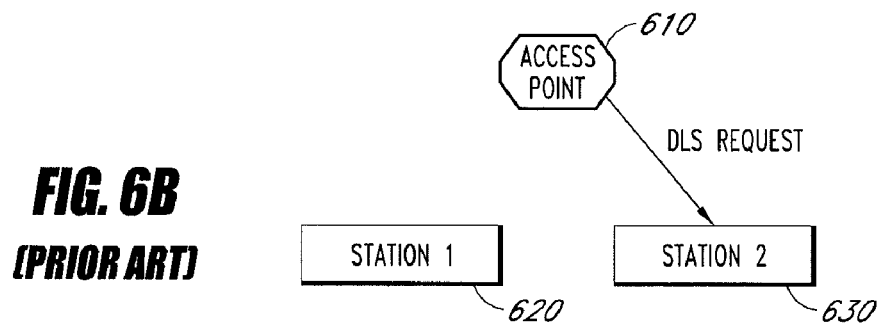
Figure 6C:
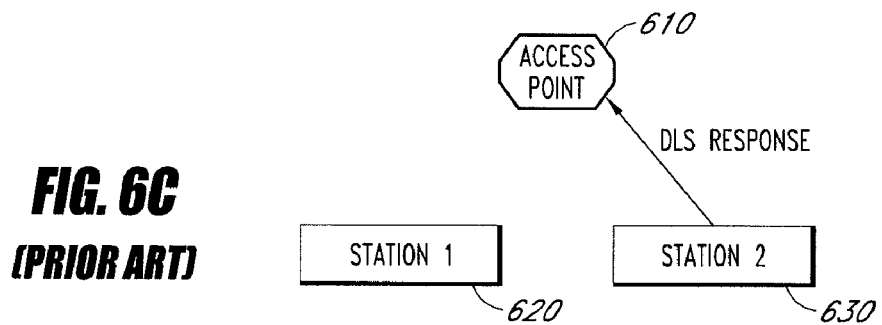
Figure 6D:
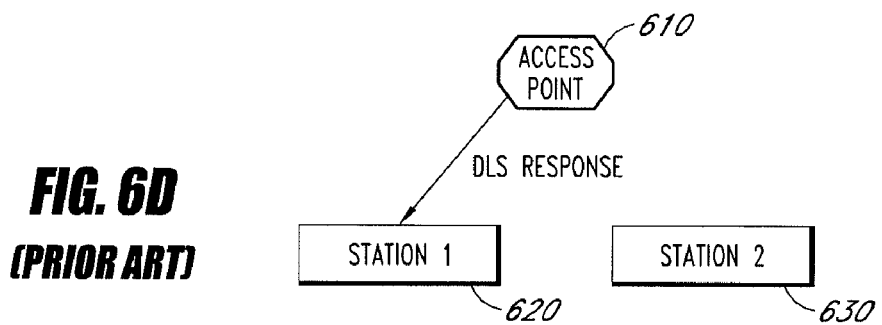

If "no" at block 510, the source station performs a direct link setup handshake process at block 520. Referring to FIGS. 6A-6D, a conventional direct link setup handshake process between source and destination stations in a wireless network is described below. As shown in FIG. 6A, a source station 620 ("STATION 1" in FIG. 6A) sends a direct link setup (DLS) request to the access point 610 of the network. The access point 610 forwards the DLS request to the destination station 630 ("STATION 2" in FIG. 6B) if the destination station 630 is allowed to have a direct link, as shown in FIG. 6B. Subsequently, if the destination station 630 accepts the DLS request, it sends a DLS response to the access point 610, as shown in FIG. 6C. The access point 610 forwards the DLS response to the source station 620, as shown in FIG. 6D.

Referring back to FIG. 5, at block 530, if the source station successfully receives the DLS response from the destination station via the access point, it can perform data communication between the source and destination stations at block 540. If, however, a direct link setup has failed ("no" at block 530), the attempt for data communication via a direct link is terminated. In the illustrated conventional wireless network, both the direct link setup and the data communication may be performed, using the same channel, for example, a channel having a frequency of 2.4 or 5 GHz.

b. Overview of Direct Link Setup In a Multi-Rate Channel Wireless Network

In some embodiments, a wireless network may include an access point and non-access point stations, and employ multi-rate channels including a high rate-channel and a low-rate channel. The network may be implemented by, for example, the wireless system described above in connection with FIG. 2. In certain embodiments, the low-rate channel may be omni-directional, and may have a frequency of about 6 GHz or lower. The high-rate channel may be directional, and may have a frequency higher than about 6 GHz. In one embodiment, the low-rate channel may have a frequency of about 2.4 or 5 GHz, and the high-rate channel may have a frequency of about 60 GHz. A skilled technologist will appreciate that the high-rate and low-rate channels may have various other frequencies, depending on the design of the system.

Such a network can also allow a direct link between two of the non-access point stations for wireless communication over the high-rate channel. In such embodiments, a direct link setup process may be performed using the low-rate channel between source and destination stations via the access point of the network. Once a direct link is set up between the stations, data communication may be performed over the high-rate channel.

Figure 7:
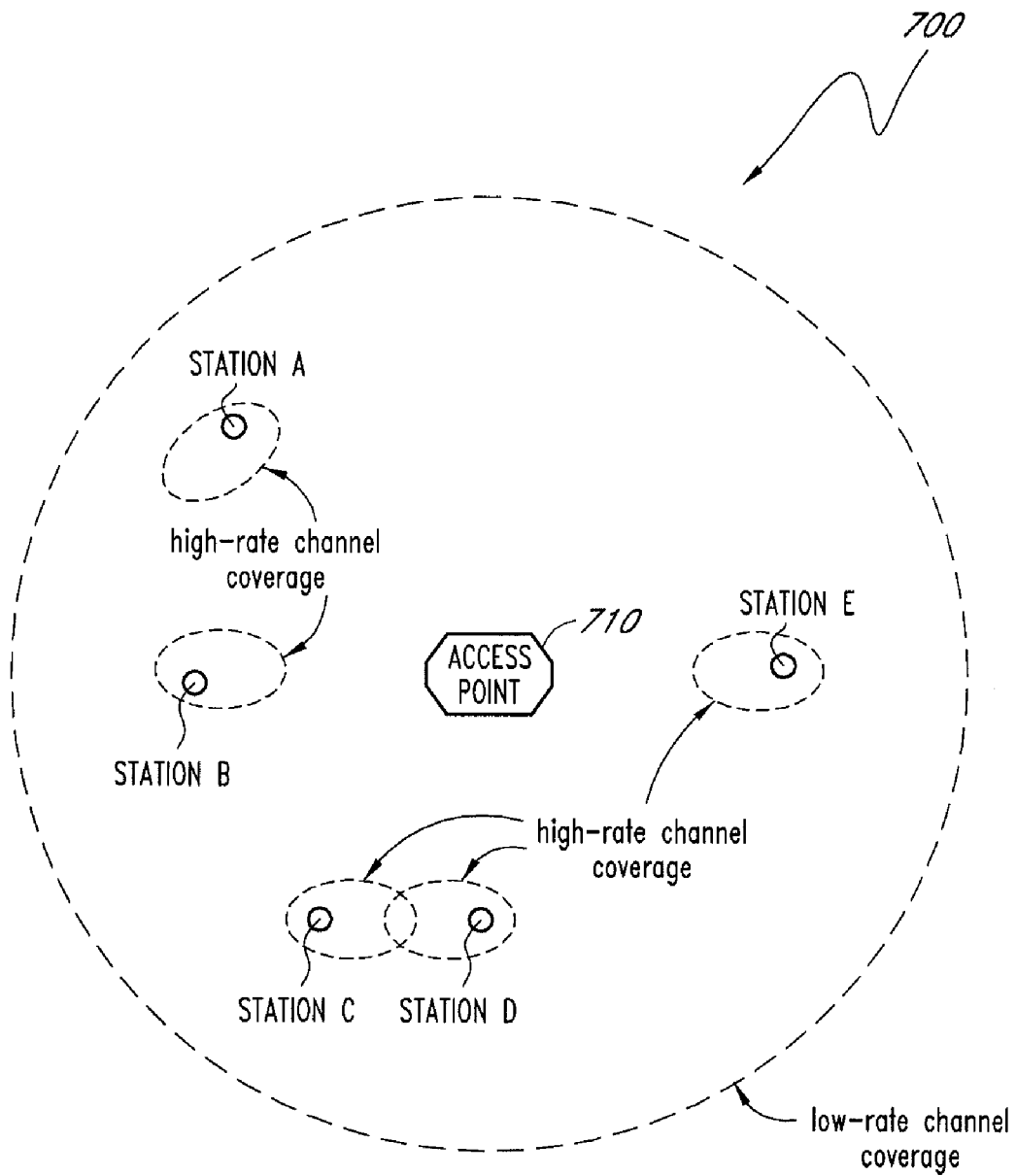
FIG. 7 is a block diagram of a multi-rate channel wireless network including stations, showing high and low rate channel coverage of the stations.

Referring to FIG. 7, a wireless network system employing a low rate channel and a high-rate channel according to one embodiment will be described below. The illustrated system 700 includes an access point 710 and five non-access point stations, STATIONS A-E. Any one of the STATIONS A-E can initiate, as a source station, a direct link setup process using the low-rate channel according to the procedure described above in connection with FIGS. 5 and 6A-6D. The source station can perform the direct link setup process for establishing a direct link for data communication over the high-rate channel.

In the illustrated system 700, the low-rate channel has a relatively longer range than the high-rate channel. Thus, in some cases, even though two stations are within a range that can be directly reached via the low-rate channel, they may not be within a range that can be directly reached via the high-rate channel, and thus cannot perform data communication over the high-rate channel. For example, the STATION A may reach STATION E over the low-rate channel, but may not reach the STATION E over the high-rate channel, and thus cannot perform data communication with the STATION E over the high-rate channel. On the other hand, STATION C and STATION D are within a range for a direct link over the high-rate channel, and thus can establish a direct link therebetween for data communication over the high-rate channel. Thus, there is a need for a method that can effectively establish a direct link over the high-rate channel between stations in such a network.

In some embodiments, at least one of the access point and non-access point stations in the multi-rate channel wireless network may maintain neighbor information on neighboring stations that can be reached via the high-rate channel. The neighbor information may be in a form of table. Such a table will be referred to as a "neighbor table" in the context of this document.

The neighbor table of a station may indicate whether there has been a two-way connection between the station and one or more of the other stations in the network over the high-rate channel. Such a two-way connection may be established by exchanging messages over the high-rate channel during a neighbor discovery process.

The neighbor table of the station may also include information on the positions of the neighboring stations relative to the station. In an embodiment where the stations use directional antennas (for example, a sector antenna) for the high-rate transmissions, the neighbor table may include information on the sectors of the antenna or angular directions that can provide the best transmission capability with the neighboring stations.

In one embodiment, in order to set up a direct link between the source station and the destination station, the source station may exchange direct link setup messages with the destination station via the access point. The direct link setup messages may include a direct link setup request and a direct link setup response. Before or during a direct link setup process, one or more of the source station, the destination station, and the access point may refer to their neighbor tables to determine if the source and destination can directly communicate with each other over the high-rate channel. In some embodiments, before the source station sends the access point a direct link setup message (i.e., a direct link setup request), it can determine if the source and destination can directly communicate with each other over the high-rate channel, based on its neighbor table. The destination station may also determine if the source and destination can directly communicate with each other over the high-rate channel, based on its neighbor table before it sends a direct link setup message (i.e., a direct link setup response). In certain embodiments, the access point may also determine if the source and destination can directly communicate with each other over the high-rate channel, based on its neighbor table before it forwards a direct link setup message (i.e., a direct link setup request) to the destination station.

In some embodiments, if one or more of the source station, the destination station, and the access point determines that the source and destination cannot directly communicate with each other over the high-rate channel, the direct link setup process may be terminated. In certain embodiments, if the neighbor table indicates that there has been no two-way connection over the high-rate channel between the source and destination stations, a neighbor discovery process may be performed between the source and destination stations before or during a direct link setup process. Therefore, the scheme provided herein can significantly reduce the number of unsuccessful direct link setup attempts, thereby reducing time wasted for unsuccessful direct link setup.

In embodiments that use directional antennas (e.g., sector antennas), a data transmission between neighboring stations requires selecting the best sectors for the transmission. If the stations have no information on the relative positions of the stations, the stations need to perform multiple transmissions around the stations before starting the data transmission. The neighbor table contains information on the best antenna sectors or angular direction for the high-rate transmissions between neighboring stations. Thus, such a neighbor table can significantly reduce latency in starting a delay-sensitive data stream, such as audio or video.

The embodiments described below may be adapted for the protocols of the conventional wireless standards, for example, IEEE 802.11. Thus, existing systems in compliance with such standards may easily utilize the aspects of the embodiments.

Figure 8:
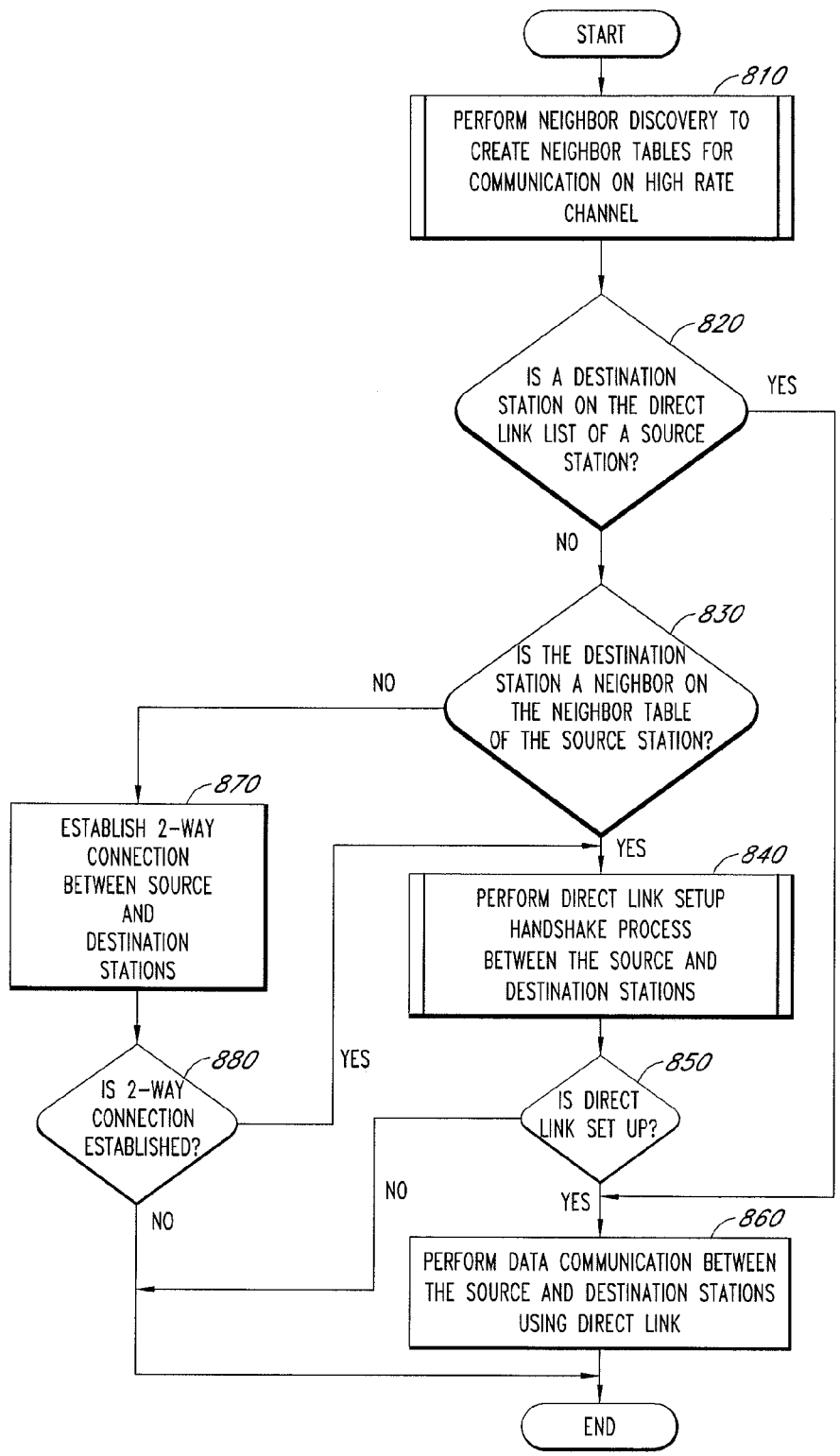
FIG. 8 is a flowchart illustrating a method of transmitting data via a direct link between stations in a wireless network according to one embodiment.

Referring to FIG. 8, a method of transmitting data via a direct link between two non-access point stations in a multi-rate channel wireless network according to one embodiment will be described below. The method may apply to any wireless system using multi-rate channels, for example, the wireless systems described above in connection with FIGS. 1, 2 and 7. The multi-rate channels may include a high-rate channel and a low-rate channel. Details of the high-rate and low-rate channels can be as described above in connection with FIG. 2. Such a system can include an access point and a plurality of non-access point stations.

At block 810, the stations in the network may perform a neighbor discovery process to determine neighboring stations that can be reached over the high-rate channel. As a part of the neighbor discovery process, the stations may create a neighbor table in each of the access point and non-access point stations in the network. In one embodiment, each station currently associated with the access point may periodically perform neighbor discovery to create or update the neighbor table.

The neighbor table may include information on neighboring stations that can be reached via the high-rate channel. Although most of the stations in the network may hear each other on the low-rate channel, only a subset of them can communicate directly with each other on the high-rate channel due to the shorter range of the high-rate channel. Details of the neighbor discovery process will be described below in connection with FIGS. 9, 10A and 10B.

At block 820, a source station may determine if a destination station is on the direct link list of the source station. The details of the direct link list can be as described above in connection with FIG. 5. If "yes" at block 820, the source station may perform data communication with the destination station using a direct link at block 860. If "no" at block 820, the process goes to block 830.

At block 830, the source station refers to its neighbor table, and determines if the destination station is indicated as a neighbor on the neighbor table of the source station. If "yes" at block 830, the source station may perform a direct link setup handshake process at block 840. During the direct link setup handshake process, direct link setup messages may be exchanged between the source and destination stations via the access point. In the embodiment described below, the direct link setup messages may be transmitted over the low-rate channel. The details of alternative direct link handshake processes will be described below in connection with FIGS. 11A-11C, 12A, and 12B.

If "no" at block 830, the process goes to block 870. At block 870, the source station attempts to establish a two-way connection with the destination station. In one embodiment, the source station may exchange neighbor discovery messages with the destination station. The neighbor discovery messages may include a neighbor discovery request and a neighbor discovery response. Examples of such a neighbor discovery request and a neighbor discovery response will be described below in connection with FIGS. 10A and 10B.

Subsequently, at block 880, it is determined if the two-way connection has been established between the source and destination stations over the high-rate channel. If "yes" at block 880, the process continues to block 840 at which the source station may perform a direct link setup handshake process. If "no" at block 880, the process for a direct link data communication is terminated.

After the direct link setup handshake process is performed at block 840, it is determined if a direct link has been successfully set up between the source and destination stations. If "yes" at block 840, the source station can perform data communication with the destination stations over the high-rate channel at block 860.

If, however, the direct link setup has failed ("no" at block 850), the process for a direct link data communication is terminated. In some embodiments, if stations fail to establish a two-way connection over the high-rate channel during a direct link setup (DLS) timeout period, the direct link setup process may be restarted at a later stage.

c. Neighbor Discovery Process

Figure 9:
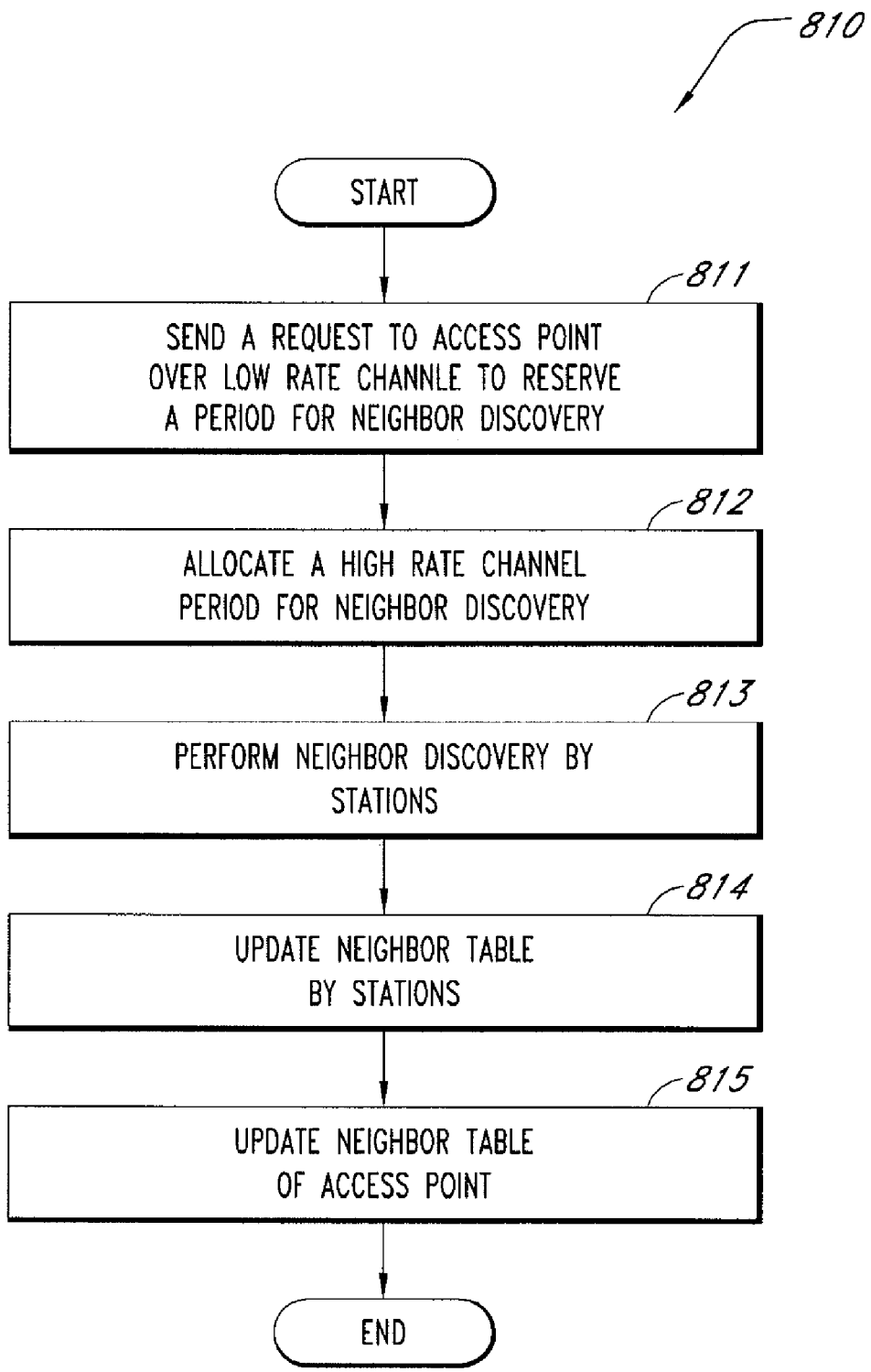
FIG. 9 is a flowchart illustrating a method of neighbor discovery for stations in a wireless network according to one embodiment.

Referring back to FIG. 8, a neighbor discovery process may be performed to create or update neighbor tables at block 810. Referring now to FIG. 9, a neighbor discovery process according to one embodiment will be described below. The illustrated process may form all or part of the block 810 in FIG. 8.

At block 811, a station in the wireless network may send a request to the access point over the low-rate channel to reserve a period for neighbor discovery. Upon receiving the request, the access point may allocate a high-rate channel period for neighbor discovery at block 812. The access point may send the stations messages on the allocation of the high-rate channel period, using the low-rate channel.

In another embodiment, stations in the network may also contend to reserve a period for neighbor discovery. In yet another embodiment, the access point may periodically allocate high-rate channel periods for neighbor discovery. In one embodiment, channel time periods on the low-rate and high-rate channels may overlap with each other in time domain. In yet another embodiment, the channel time periods on the low-rate and high-rate channels may not overlap with each other in time domain such that at a given instance only one channel is active in communication.

Then, stations in the network, including the station that has sent the request, can perform neighbor discovery at block 813. A skilled technologist will appreciate that various neighbor discovery schemes may be used for the neighbor discovery. At block 814, each of the stations may update its neighbor table if there is an update. At block 815, if there has been an update, the stations may inform the access point of the update so that the access point may update its neighbor table.

In another embodiment in compliance with IEEE 802.11, in a basic service set (BSS), the access point can first reserve the low-rate channel by transmitting a clear-to-self (cts-to-self) control message or gaining the contention-free access of the channel after a point interframe space (PIFS) duration. Subsequently, during this reserved period, the access point may send another control message on the low-rate channel to require all or a sub-set of stations to switch to a particular high-rate channel and perform neighbor discovery within a specified time period.

In yet another embodiment in compliance with IEEE 802.11, the access point can send a Contention Free Poll (CF_Poll) message to reserve the low-rate channel. CF_Poll of IEEE 802.11 may be modified to include an Information Element (IE), which informs the stations to perform a neighbor discovery on the high-rate channel. In one instance, CF_Poll can include neighbor discovery information on the sender and receiver. After receiving the CF_Poll, the stations may switch to the high-rate channel and exchange neighbor discovery request and response messages.

In certain embodiments, it is possible to include a list of neighboring pairs of stations in one CF_Poll to amortize the overhead of CF_poll over multiple high-rate neighbor discovery messages. If a station has not yet discovered its neighbor on the high-rate channel and the station supports only directional transmissions on the high-rate channel, the neighbor discovery messages may be repeatedly sent S times (each at different sector), where S is the number of sectors to cover 360° space or a desired region of space. In yet another embodiment, stations may first reserve the low-rate channel using Enhanced Distributed Channel Access (EDCA) contention scheme under IEEE 802.11, and perform the high-rate channel neighbor discovery during this reserved period.

Figure 10A:
FIG. 10A is a frame format of a neighbor discovery request according to one embodiment.
Figure 10B:
FIG. 10B is a frame format of a neighbor discovery response according to one embodiment.

Referring to FIGS. 10A and 10B, neighbor discovery messages according to one embodiment will be described below. FIG. 10A shows one embodiment of a neighbor discovery request. The illustrated neighbor discovery request 1000A includes a basic service set ID (BSSID) field 1010a, a source station address field 1020a, a destination station address field 1030a, a link quality type field 1040a, a high-rate channel ID field 1050a, and a field 1060a for two-way neighbor status on high-rate channel.

The basic service set ID (BSSID) field 1010a may include the ID of the basic service set to which the stations belong. The source station address field 1020a and the destination station address field 1030a may include the addresses of the source and destination stations, respectively. The link quality type field 1040a may include a bitmap which can represent a Received Channel Power Indicator (RCPI), a Received Signal to Noise Indicator (RSNI), a Received Signal Strength Indicator (RSSI), or a combination thereof of the high-rate channel ID included in the high-rate channel ID field 1050a.

The field 1060a for two-way neighbor status on high-rate channel may indicate the two-way neighbor status between the source and destination stations at the time the neighbor discovery request is transmitted. Possible values in the field 1060a are: none, one-way, or two-way. The field 1060a may include "none" if no neighbor discovery message has been exchanged between the source and destination stations. If any single neighbor discovery message has been received between the source and destination stations, the field 1060a may include "one-way." If there has been an exchange of neighbor discovery messages between the source and destination stations, the field 1060a may include "two-way."

FIG. 10B shows one embodiment of a neighbor discovery response. The illustrated neighbor discovery response 1000B includes a basic service set ID (BSSID) field 1010b, a source station address field 1020b, a destination station address field 1030b, a field 1070b for a two-way neighbor status on high-rate channel, and a high-rate channel (HRC) link quality field 1080b. The details of the basic service set ID (BSSID) field 1010b, the source station address field 1020b and the destination station address field 1030b can be as described above in connection with FIG. 10A.

The field 1070b for two-way neighbor status on high-rate channel may indicate the two-way neighbor status between the source and destination stations at the time the neighbor discovery response is transmitted. Possible values in the field 1070b are: one-way or two-way. If the destination station has only received any neighbor discovery message from the source destination station, the field 1070b may include "one-way." If there has been an exchange of neighbor discovery messages between the source and destination stations, the field 1070b may include "two-way." The value in the field 1070b of the response 1000B may be different from the value in the field 1060a of the request 1000A, depending on whether the link is being established or has been already established.

The link quality field 1080b may include a value indicative of the quality of the high-rate channel. A skilled technologist will appreciate that various other frame formats may be used for the neighbor discovery messages.

A neighbor table that can be generated or updated by any of the neighbor discovery schemes described above may include various information on neighbors of a station in the network. One example of the neighbor table of a station is shown in Table 1 below.

TABLE 1

High-Rate Channel Neighbor Table For Station with MAC ID = e

| Neighbor Address (MAC ID) | Link Status | Last Update Time | Validity Period | High-rate Channel ID and Quality | Best Antenna Sectors |
|---|---|---|---|---|---|
| a | 2-Way | T1 | t | Ch1, link quality | Sector 1 |
| b | 1-Way (from e to b) | T2 | 2t | Ch2, no link quality | Sector 2 |
| c | 2-way | T3 | 2t | Ch3, no link quality | Sector 3 |
| d | 1-way (from d to e) | T4 | t | Ch4, link quality | Sector 4 |

In Table 1, the "neighbor address" field indicates the MAC ID of a neighboring station. The "link status" field may indicate the status of a high-rate link between the station and a neighboring station. The "last update time" field may indicate the time when the entry was last updated.

The "validity period" field may indicate the length of time during which the entry is valid. In one embodiment, the access point may periodically allocate a contention-free period for a neighbor discovery on the high rate channel before a validity period expires. In addition, as described above in connection with FIG. 9, individual stations can also initiate a neighbor discovery by reserving the high-rate channel or requesting the access point to allocate the contention free channel period. If an entry in the neighbor table is not updated within the validity period in the neighbor table, the entry may be purged or the link status field may be changed to have a different value.

The "high-rate channel ID and quality" field may contain information on a high-rate channel ID and link-quality. The information in this field may be the same as those specified in neighbor discovery messages which are described above in connection with FIGS. 10A and 10B.

The "best antenna sectors" field may include a list of best antenna sectors in term of link quality in embodiments in which stations use a sector antenna. Since the high-rate transmissions are directional, some sectors of the antenna may have higher link quality than other sectors of the antenna. In other embodiments, the "best antenna sectors" field may include information on one or more angular directions, instead of sectors of the antenna. A skilled technologist will appreciate that the neighbor table may include other information on the neighboring stations and links for data communication.

In certain embodiments, the neighbor table may also indicate whether the station has been in a direct link with the neighboring stations, incorporating the information of the direct link list of the station. In some embodiments, a wireless network may use two or more high-rate channels. In such embodiments, a station can maintain multiple neighbor entries of a neighboring station for the different high-rate channels.

In some embodiments, each of the stations in the network may periodically provide the access point with information on its neighbor table. The access point may use the information to create and update its own neighbor table including entries of all the stations in the network that can use the high-rate channel. The neighbor table of the access point can assist the access point to maintain the complete view of high-rate links in the network.

d. Direct Link Setup Handshake Process In a Multi-Rate Channel Wireless Network

Figure 11A:
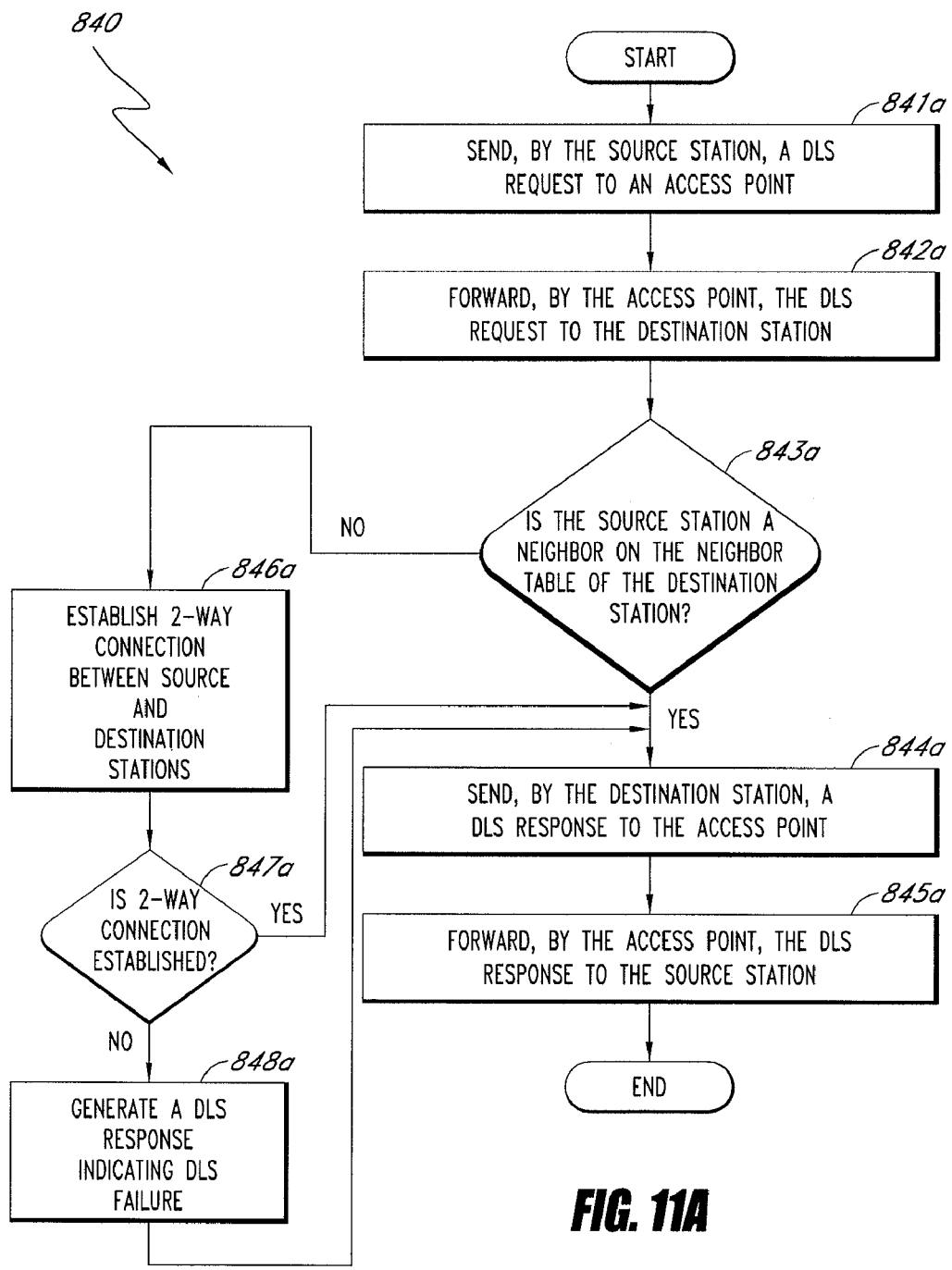
FIG. 11A is a flowchart illustrating a method of setting up a direct link between stations in a wireless network according to one embodiment.
Figure 11B:
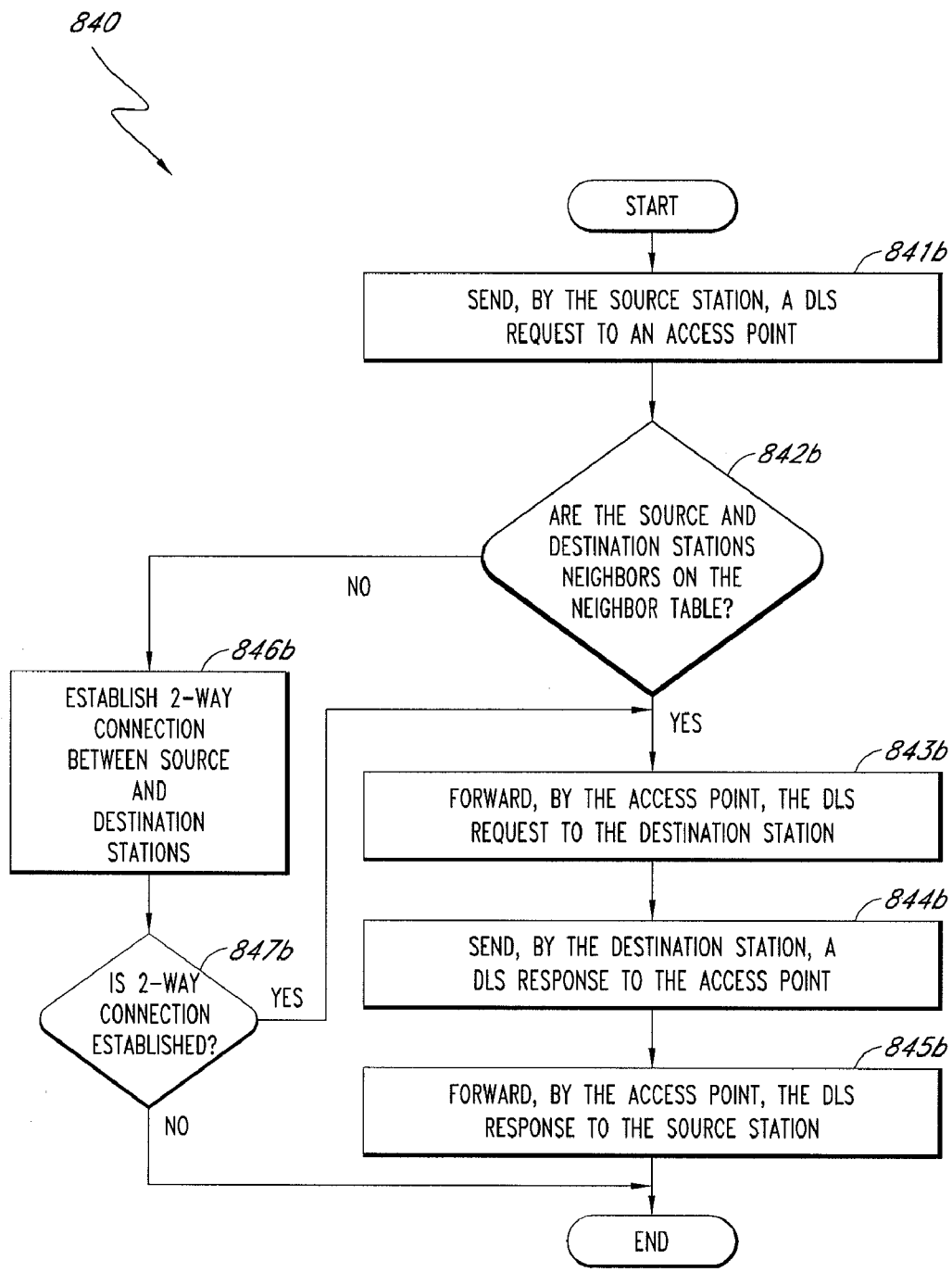
FIG. 11B is a flowchart illustrating a method of setting up a direct link between stations in a wireless network according to another embodiment.
Figure 11C:
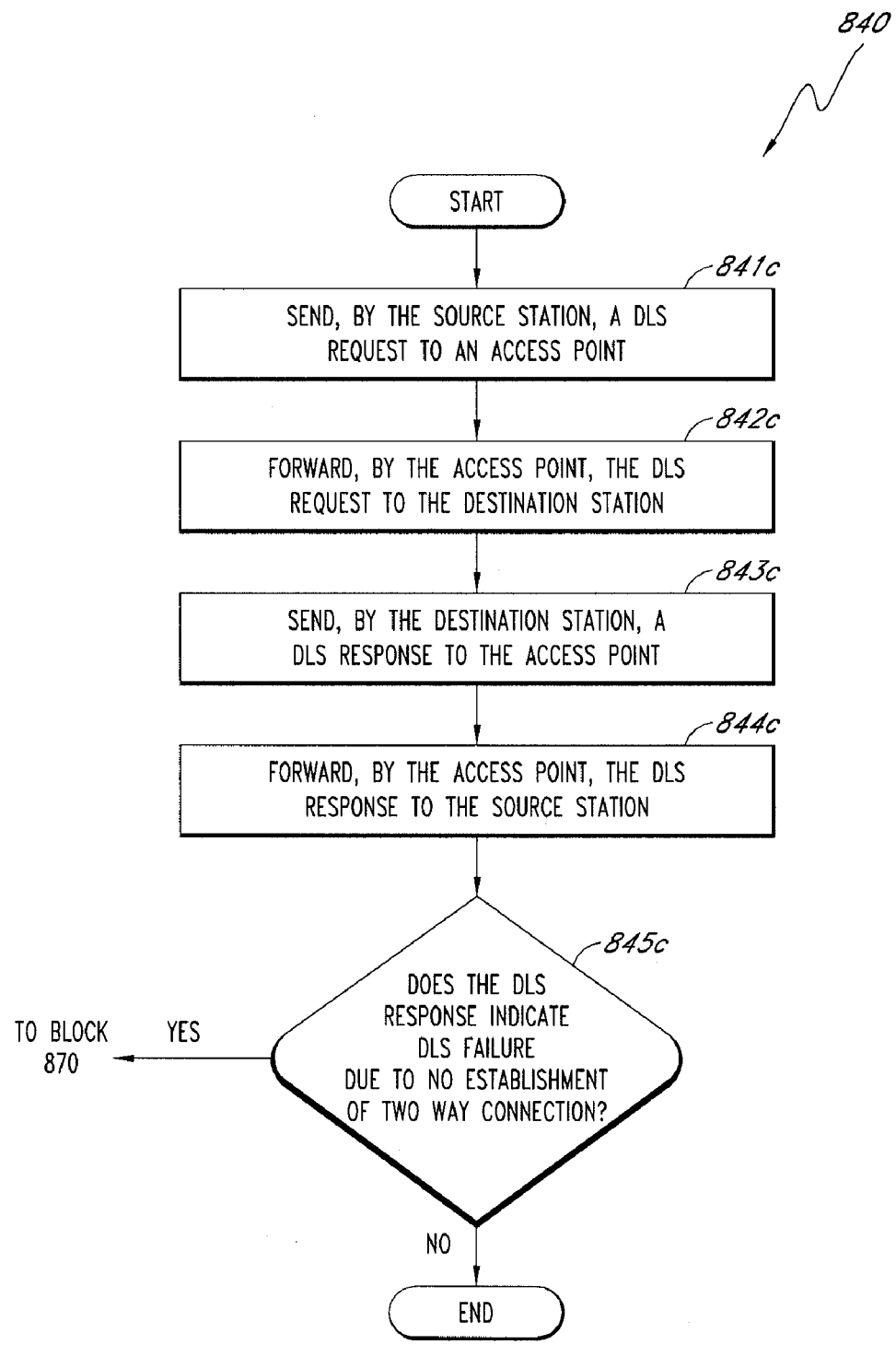
FIG. 11C is a flowchart illustrating a method of setting up a direct link between stations in a wireless network according to yet another embodiment.

Referring back to FIG. 8, the direct link setup handshake process may be performed to establish a direct link between the source and destination stations at block 840. Referring now to FIGS. 11A-11C, alternative embodiments of the direct link setup handshake process will be described below in detail.

Referring to FIG. 11A, a direct link setup handshake process according to one embodiment will be described below. The illustrated process may form all or part of the block 840 in FIG. 8.

At block 841a, the source station may send a direct link setup (DLS) request to the access point. The DLS request may contain information on a rate set, capabilities of the source station, and the MAC addresses of the source and destination stations. The details of the DLS request will be described below in connection with FIG. 12A.

At block 842a, the access point may forward the DLS request to the destination station if the destination station is allowed to have a direct link. In one embodiment in which the wireless system is in compliance with IEEE 802.11, the access point may determine at least one of: (1) if the destination station is associated in the basic service set (BSS), (2) if direct streams are allowed in the policy of the BSS, and (3) if the destination station is a Quality-of-service (QoS) station with the capability of high-rate radio. If one or more of the requirements (1) to (3) are met, the access point may forward the DLS request to the destination station. In the illustrated embodiment, only when all of the requirements (1) to (3) are met, the access point may forward the DLS request to the destination station. In case any one of the requirements (1) to (3) is not met, the access point may terminate the process, and may inform the source station of a DLS failure (not shown).

At block 843a, upon receiving the DLS request from the access point, the destination station may determine if the source station indicated in the DLS request is a neighbor on the neighbor table of the destination station. In certain embodiments, the destination station may also optionally determine if it accepts a direct stream over the high-rate channel. If "yes" to these inquiries, the process may proceed to block 844a.

At block 844a, the destination station may send a DLS response to the access point. The DLS response may contain information on a rate set, capabilities of the destination station, and the MAC addresses of the source and destination stations. The details of the DLS response will be described below in connection with FIG. 12B.

If "no" to any of the inquiries at block 843a, the process goes to block 846a. At block 846a, the destination station attempts to establish a two-way connection with the source station. In one embodiment, the destination station may inform the access point of a need for establishing a two-way connection between the source and destination stations, and request allocation of a contention-free period for a neighbor discovery. In such an embodiment, the destination station may exchange neighbor discovery messages with the source station during the allocated contention-free period. The neighbor discovery messages may include a neighbor discovery request and a neighbor discovery response. Such a request and a response can be as described above in connection with FIGS. 10A and 10B.

Subsequently, at block 847a, it is determined if a two-way connection has been established between the source and destination stations. If "yes" at block 847a, the process continues to block 844a. If "no" at block 847a, the destination station may generate a DLS response that indicates a DLS failure at block 848a. Then, at block 844a, the destination station may send the access point the DLS response with the indication of a DLS failure.

At block 845a, the access point may forward the DLS response to the source station. Then, the process continues to block 850 of FIG. 8.

Referring to FIG. 1B, a direct link setup handshake process according to another embodiment will be described below. The illustrated process may form all or part of the block 840 in FIG. 8.

At block 841b, the source station may send a direct link setup (DLS) request to the access point. The DLS request may contain information on a rate set, capabilities of the source station, and the MAC addresses of the source and destination stations. The details of the DLS request will be described below in connection with FIG. 12A.

At block 842a, the access point may determine if the destination station is allowed to have a direct link. In one embodiment in which the wireless system is in compliance with IEEE 802.11, the access point may determine at least one of: (1) if the destination station is associated in the basic service set (BSS), (2) if direct streams are allowed in the policy of the BSS, and (3) if the destination station is a Quality-of-service (QoS) station with the capability of high-rate radio. The access point may further determine at least one of: (4) if the source station has established a two-way connection with the destination station; and (5) if the destination station has established a two-way connection with the source station, referring to the neighbor table of the access point.

In some embodiments, if one or more of the requirements (1) to (5) are met, the access point may forward the DLS request to the destination station. In the illustrated embodiment, only when all of the requirements (1) to (5) are met, the access point may forward the DLS request to the destination station at block 843b. In case any one of the requirements (1) to (3) is not met, the access point may terminate the process, and may inform the source station of a DLS failure (not shown). If all of the requirements (1) to (3) are met, but either or both of the requirements (4) and (5) is not met, the process may go to block 846b.

At block 846b, the access point may allocate a contention-free period for a neighbor discovery between the source and destination stations, and may request the source and destination stations to perform a neighbor discovery process. One of the source and destination stations may attempt to establish a two-way connection with the other of the source and destination stations. In such an embodiment, the stations may exchange neighbor discovery messages with each other during the allocated contention-free period. The neighbor discovery messages may include a neighbor discovery request and a neighbor discovery response. Such a request and a response can be as described above in connection with FIGS. 10A and 10B.

Subsequently, at block 847b, it is determined if a two-way connection has been established between the source and destination stations. If "yes" at block 847b, the process continues to block 843b. If "no" at block 847b, the handshake process may be terminated as indicated by the direct link setup (DLS) failure notification from the access point (not shown), and the source station may make another attempt to establish the direct link with the destination station.

At block 844b, upon receiving the DLS request from the access point, the destination station may determine if the source station indicated in the DLS request is a neighbor on the neighbor table of the destination station. In certain embodiments, the destination station may also optionally determine if it accepts a direct stream over the high-rate channel. In another embodiment, the destination station may simply generate a DLS request indicating a successful DLS, relying on the access point's determination that all the requirements (1) to (5) have been met. Then, the destination station may send the DLS response to the access point. The DLS response may contain information on a rate set, capabilities of the destination station, and the MAC addresses of the source and destination stations. The details of the DLS response will be described below in connection with FIG. 12B.

At block 845b, the access point may forward the DLS response to the source station. Then, the process may proceed to block 850 of FIG. 8.

In the embodiment illustrated in FIG. 11B, the access point determines if a direct link can be established between the source and destination stations before forwarding the DLS request to the destination station. If a direct link cannot be established, the access point terminates the direct link setup process at that point. Thus, this scheme can reduce channel time wasted for unsuccessful direct link setup attempts.

Referring to FIG. 11C, a direct link setup handshake process according to yet another embodiment will be described below. The illustrated process may form all or part of the block 840 in FIG. 8.

At block 841c, the source station may send a direct link setup (DLS) request to the access point. The DLS request may contain information on a rate set, capabilities of the source station, and the MAC addresses of the source and destination stations. The details of the DLS request will be described below in connection with FIG. 12A.

At block 842c, the access point may forward the DLS request to the destination station if the destination station is allowed to have a direct link. In one embodiment in which the wireless system is in compliance with IEEE 802.11, the access point may determine at least one of: (1) if the destination station is associated in the basic service set (BSS), (2) if direct streams are allowed in the policy of the BSS, and (3) if the destination station is a Quality-of-service (QoS) station with the capability of high-rate radio. If one or more of the requirements (1) to (3) are met, the access point may forward the DLS request to the destination station at block 842c. In the illustrated embodiment, only when all of the requirements (1) to (3) are met, the access point may forward the DLS request to the destination station. In case any one of the requirements (1) to (3) is not met, the access point may terminate the process, and may inform the source station of a DLS failure (not shown).

At block 843c, upon receiving the DLS request from the access point, the destination station may determine if the source station indicated in the DLS request is a neighbor on the neighbor table of the destination station. In other words, the destination station may determine if there has been a two-way connection between the source and destination stations over the high-rate channel. In certain embodiments, the destination station may also optionally determine if it accepts a direct stream over the high-rate channel.

If "yes" to these inquiries, the destination station may generate a first DLS response indicating a successful DLS. If "no" to any of the inquiries, the destination station may generate a second DLS response indicating a DLS failure and the reason of the failure. The second DLS response indicating a DLS failure may include a request for the source station to establish a two-way connection between the source and destination stations.

Subsequently, the destination station may send either the first or second DLS response to the access point, depending on the answers to the above inquiries. The DLS response may also contain information on a rate set, capabilities of the destination station, and the MAC addresses of the source and destination stations. The details of the DLS response will be described below in connection with FIG. 12B. At block 844c, the access point may forward the DLS response to the source station.

Subsequently, at block 845c, the source station may determine if the DLS response it has received indicates a successful DLS or a DLS failure. If the DLS response indicates a successful DLS, the process may continue to block 850 of FIG. 8. If the DLS response indicates a DLS failure due to no previous two-way connection between the source and destination stations, the process may go to the block 870 of FIG. 8. If the DLS response indicates a DLS failure due to inability of the destination station to accept a direct stream, the process for a direct link data transmission may be terminated.

e. Frame Formats of DLS Request and Response

In the embodiments described above in connection with FIGS. 11A-11C, DLS requests and responses can be used. Referring to FIG. 12A, one embodiment of the frame format of a DLS request will be described below. The illustrated DLS request frame 1200A includes a category field 1210a, an action field 1220a, a destination address field 1230a, a source address field 1240a, a capability information filed 1250a, a DLS timeout value field 1260a, a supported rates field 1270a, and an extended supported rates field 1280a.

The category field 1210a may include a value indicating that the frame is for direct link setup. The action field 1220a may include a value indicating that the frame is a DLS request for data communication on the high-rate channel.

The destination address field 1230a and the source address field 1240a may contain the MAC addresses of the destination and source stations, respectively. The capability information filed 1250a may include a value indicating the capability information of the source station.

The DLS timeout value field 1260a may include a value indicative of a duration, in seconds, after which the direct link is terminated, if there are no frame exchanges within the duration between the source and destination stations. The supported rates field 1270a and the extended supported rates field 1280a may contain the supported data rates information of the source station. Other details of the fields 1210a-1280a can be as described in the IEEE 802.11 standard, the disclosure of which is incorporated by reference in its entirety.

Referring to FIG. 12B, one embodiment of the frame format of a DLS response will be described below. The illustrated DLS response frame 1200B includes a category field 1210b, an action field 1220b, a status code field 1225b, a destination address field 1230b, a source address field 1240b, a capability information filed 1250b, a supported rates field 1270b, and an extended supported rates field 1280b.

The category field 1210b may include a value indicating that the frame is for direct link setup. The action field 1220b may include a value indicating that the frame is a DLS response for data communication on the high-rate channel. The status code field 1225b may contain a value indicative of the success or failure of a requested direct link setup operation. In one embodiment, the status code field 1225b may contain one of a plurality of values, depending on the reason why the requested direct link cannot be established. For example, if the direct link cannot be set up because the source station is not a neighbor on the neighbor table of the destination station, the status code field 1225b may include a value reserved to indicate the status.

The destination address field 1230b and the source address field 1240b may contain the MAC addresses of the destination and source stations, respectively. The destination address field 1230b and the source address field 1240b may contain the same values as those of the destination address field 1230a and the source address field 1240a of the DLS request 1200A that the destination station has received from the source station.

The capability information filed 1250a may include a value indicating the capability information of the destination station. The supported rates field 1270a and the extended supported rates field 1280a may contain the supported data rates information of the destination station. Other details of the fields 1210b-1280b can be as described in the IEEE 802.11 standard, the disclosure of which is incorporated by reference in its entirety.

In the methods of the embodiments described above, one or more blocks may be omitted, depending on the design of the system. In addition, two or more of the blocks may be combined together. A skilled technologist will also appreciate that the methods may include additional blocks, depending on the design of the system.

The embodiments described above may be used for data (e.g., video data and audio data) streaming over a wireless network. For example, the embodiments may be adapted for transmission of uncompressed video in a wireless local area network (WLAN) under the IEEE 802.11 standard. The embodiments can also be adapted for a wireless system having a very high throughput (VHT) of about 0.5 Gbps to about 4 Gbps. In other arrangements, the embodiments can be adapted for a wireless system having a bandwidth of 60 GHz, while supporting the IEEE 802.11 standard.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of data communication in a wireless network comprising a plurality of access point and non-access point stations that are capable of transmitting data and/or control signals over a first channel and a second channel, the first channel having a first frequency and directionality, the second channel having a second frequency and omni-directionality, the second frequency being lower than the first frequency, the method comprising:
    determining, by a source non-access point station including source neighbor information on non-access point stations neighboring the source station, whether a destination non-access point station is capable of being in a direct link with the source station over the first channel, based at least partly on the source neighbor information; and
    transmitting, by the source station, a request for establishing a direct link with the destination station to the access point over the second channel.

2. The method of claim 1, wherein the source neighbor information comprises one or more of the address of a neighboring station, a link status between the source station and the neighboring station, the last update time of the information, the ID and link quality of the first channel, and the direction of the neighboring station relative to the source station.

3. The method of claim 1, further comprising performing a neighbor discovery between the non-access point stations before determining whether the destination station is capable of being in a direct link with the source station.

4. The method of claim 1, further comprising determining if the destination station has been in a direct link over the first channel with the source station before determining whether the destination station is capable of being in a direct link with the source station.

5. The method of claim 1, further comprising performing a neighbor discovery between the source and destination stations to establish a two-way connection therebetween over the first channel after determining whether the destination station is capable of being in a direct link with the source station.

6. The method of claim 1, wherein the destination station includes destination neighbor information on non-access point stations neighboring the destination station, wherein the method further comprises:
    forwarding, by the access point, the request for establishing a direct link to the destination station; determining, by the destination station, whether the source and destination stations are capable of being in a direct link with each other over the first channel, based at least partly on the destination neighbor information;
    transmitting, by the destination station, a response for establishing a direct link to the access point; and
    forwarding, by the access point, the response for establishing a direct link to the source station.

7. The method of claim 6, further comprising: performing a neighbor discovery between the source and destination stations to establish a two-way connection therebetween over the first channel
    after determining, by the destination station, whether the source and destination stations are capable of being in a direct link with each other over the first channel, and
    before transmitting, by the destination station, the response for establishing a direct link to the access point.

8. The method of claim 6, further comprising: including, by the destination station, a request for a neighbor discovery in the response for establishing a direct link
    after determining, by the destination station, whether the source and destination stations are capable of being in a direct link with each other over the first channel, and
    before transmitting, by the destination station, the response for establishing a direct link to the access point.

9. The method of claim 1, wherein the access point includes access point neighbor information on relationships between non-access point stations neighboring each other in the network, wherein the method further comprises:
    determining, by the access point, whether the source and destination stations are capable of being in a direct link with each other over the first channel, based at least partly on the access point neighbor information;
    forwarding, by the access point, the request for establishing a direct link to the destination station; transmitting, by the destination station, a response for establishing a direct link to the access point; and
    forwarding, by the access point, the response for establishing a direct link to the source station.

10. The method of claim 9, further comprising: performing a neighbor discovery between the source and destination stations to establish a two-way connection therebetween over the first channel
    after determining, by the access point, whether the source and destination stations are capable of being in a direct link with each other over the first channel, and
    before forwarding, by the access point, the request for establishing a direct link to the destination station.

11. The method of claim 9, wherein the destination station includes destination neighbor information on non-access point stations neighboring the destination station,
    wherein the method further comprises: determining, by the destination station, whether the source and destination stations are capable of being in a direct link with each other over the first channel, based at least partly on the destination neighbor information
    after forwarding, by the access point, the request for establishing a direct link to the destination station, and
    before transmitting, by the destination station, the response for establishing a direct link to the access point.

12. The method of claim 1, wherein the first frequency is about 6 GHz or greater, and wherein the second frequency is about 6 GHz or lower.

13. The method of claim 1, wherein the request for establishing a direct link comprises a direct link setup (DLS) request in compliance with IEEE 802.11.

14. A method of wireless communication in a wireless network comprising a plurality of access point and non-access point stations that are capable of transmitting data and/or control signals over a first channel and a second channel, the first channel having a first frequency and directionality, the second channel having a second frequency and omni-directionality, the second frequency being lower than the first frequency, the method comprising:

receiving over the second channel, by the access point, a request from a source non-access point station for establishing a direct link with a destination non-access point station; and determining, by the access point including access point neighbor information on relationships between non-access point stations neighboring each other in the network, whether the source and destination stations are capable of being in a direct link with each other over the first channel, based at least partly on the access point neighbor information.

15. The method of claim 14, further comprising allocating, by the access point, a contention-free period for a neighbor discovery between the source and destination stations to establish a two-way connection therebetween over the first channel after determining whether the source and destination stations are capable of being in a direct link with each other over the first channel.

16. A method of wireless communication in a wireless network comprising a plurality of access point and non-access point stations that are capable of transmitting data signals over a first channel and data and/or control signals over a second channel, the first channel having a first frequency and directionality, the second channel having a second frequency and omni-directionality, the second frequency being lower than the first frequency, the method comprising:

receiving over the second channel, by a destination non-access point station, a request for establishing a direct link with the destination station from a source non-access point station via the access point, wherein the destination station includes neighbor information on non-access point stations neighboring the destination station; and determining, by the destination station, whether the source and destination stations are capable of being in a direct link with each other over the first channel, based at least partly on the neighbor information.

17. The method of claim 16, further comprising: transmitting, by the destination station, a response for establishing a direct link to the access point after determining whether the source and destination stations are capable of being in a direct link with each other over the first channel.

18. The method of claim 17, further comprising: performing a neighbor discovery between the source and destination stations to establish a two-way connection therebetween over the first channel after determining whether the source and destination stations are capable of being in a direct link with each other, and before transmitting the response.

19. A device for wireless communication in a wireless network including an access point, the device comprising:

a first antenna system configured to provide directional transmission/reception over a first channel at a first frequency within a first range;

a second antenna system configured to provide omni-directional transmission/reception over a second channel at a second frequency within a second range, the second frequency being lower than the first frequency, the second range being greater than the first range;

neighbor information on relationships between the device and other wireless devices in the wireless network; and a medium access control (MAC) layer configured to send the access point a request for establishing a direct link over the first channel with one of the other wireless devices, wherein the MAC layer is further configured to determine whether to send the request, based at least partly on the neighbor information.

20. The device of claim 19, wherein the request for establishing a direct link comprises a direct link setup (DLS) request in compliance with IEEE 802.11.

21. The device of claim 20, wherein the DLS request comprises an action field indicating that the request is for a direct link setup for the first channel.

22. The device of claim 19, wherein the MAC layer is further configured to send the request using the second antenna system.

23. The device of claim 19, wherein the MAC layer is further configured to perform a neighbor discovery with the one of the other wireless devices before determining whether to send the request.

24. The device of claim 19, wherein the MAC layer is further configured to perform a neighbor discovery with the one of the other wireless devices after determining whether to send the request.

25. The device of claim 19, wherein the MAC layer is further configured to send the access point a response for establishing a direct link over the first channel with another of the other wireless devices, and wherein the MAC layer is further configured to determine whether the wireless device is capable of being in a direct link with the other wireless device, based at least partly on the neighbor information.

26. The device of claim 25, wherein the response for establishing a direct link comprises a direct link setup (DLS) response in compliance with IEEE 802.11.

27. The device of claim 26, wherein the DLS response comprises a status code field indicating whether the wireless device is capable of being in a direct link over the first channel with the other wireless device.

28. The device of claim 25, wherein the MAC layer is further configured to perform a neighbor discovery with the other wireless device after determining whether the wireless device is capable of being in a direct link with the other wireless device.

29. The device of claim 19, wherein the first frequency is about 6 GHz or greater, and wherein the second frequency is about 6 GHz or lower.

30. The device of claim 19, wherein the first frequency comprises about 60 GHz, and wherein the second frequency comprises about 2.4 GHz or about 5 GHz.

31. The device of claim 19, wherein the MAC layer comprises one or more of a control plane, a management plane, a high-rate data plane, and a low-rate data plane, and wherein one or more of the control plane, the management plane, and the low-rate data plane are in compliance with IEEE 802.11.

32. An access point device for wireless communication in a wireless network including wireless stations, the device comprising:

a first antenna system configured to provide directional transmission/reception over a first channel at a first frequency within a first range;

a second antenna system configured to provide omni-directional transmission/reception over a second channel at a second frequency within a second range, the second frequency being lower than the first frequency, the second range being greater than the first range;

information on relationships between wireless stations neighboring each other in the wireless network; and a medium access control (MAC) layer configured to receive, from a source station, a request for establishing a direct link over the first channel between the source station and a destination station, wherein the MAC layer is further configured to determine whether to forward the request to the destination station, based at least partly on the information.

33. The device of claim 32, wherein the MAC layer is further configured to allocate a period for a neighbor discovery between the source and destination stations after determining whether to forward the request.

34. The device of claim 32, wherein the MAC layer is further configured to periodically allocate a period for a neighbor discovery between the wireless stations in the wireless network.

35. A wireless communication system, comprising:
a first wireless device;
a second wireless device; and
an access point,
wherein each of the first and second wireless devices and the access point comprises:
a first antenna system configured to provide directional transmission/reception at a first frequency within a first range;
a second antenna system configured to provide omni-directional transmission/reception at a second frequency within a second range, the second frequency being lower than the first frequency, the second range being greater than the first range; and
information on relationships between wireless stations neighboring each other in the wireless network,
wherein one or more of the first and second wireless devices and the access point is configured to transmit a message in an attempt to establish a direct link over the first channel between the first and second stations,
wherein the one or more of the first and second wireless devices and the access point is further configured to determine whether a direct link can be established over the first channel between the first and second stations, based at least partly on the information, before transmitting the frame.

36. The system of claim 35, wherein the first frequency is about 6 GHz or greater, and wherein the second frequency is about 6 GHz or lower.

* * * * *